(12) United States Patent
Miki et al.

(10) Patent No.: US 8,005,063 B2
(45) Date of Patent: Aug. 23, 2011

(54) UPLINK CHANNEL RECEIVING AND TRANSMITTING APPARATUSES AND METHODS

(75) Inventors: Nobuhiko Miki, Yokohama (JP); Hiroyuki Atarashi, Yokohama (JP); Sadayuki Abeta, Yokohama (JP); Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 438 days.

(21) Appl. No.: 11/910,250

(22) PCT Filed: Mar. 20, 2006

(86) PCT No.: PCT/JP2006/305512
§ 371 (c)(1),
(2), (4) Date: Apr. 9, 2009

(87) PCT Pub. No.: WO2006/109437
PCT Pub. Date: Oct. 19, 2006

(65) Prior Publication Data
US 2009/0201902 A1    Aug. 13, 2009

(30) Foreign Application Priority Data
Apr. 1, 2005    (JP) .................................. 2005-106909

(51) Int. Cl.
*H04B 7/212* (2006.01)
(52) U.S. Cl. ....................................................... 370/347
(58) Field of Classification Search .................. None
See application file for complete search history.

(56) References Cited

U.S. PATENT DOCUMENTS

| 5,612,701 | A | 3/1997 | Diekelman |
| 2003/0022649 | A1* | 1/2003 | Voyer .......................... 455/277.1 |
| 2003/0092379 | A1* | 5/2003 | Brothers et al. .............. 455/12.1 |
| 2003/0142656 | A1* | 7/2003 | Padovani et al. .............. 370/347 |
| 2003/0162551 | A1 | 8/2003 | Atarashi et al. |
| 2004/0156386 | A1 | 8/2004 | Atarashi et al. |
| 2004/0213196 | A1 | 10/2004 | Deng et al. |
| 2005/0174930 | A1* | 8/2005 | Pedersen et al. .............. 370/208 |
| 2005/0239464 | A1* | 10/2005 | Iacono .......................... 455/436 |

FOREIGN PATENT DOCUMENTS

| CN | 1440212 A | 9/2003 |
| CN | 1585298 | 2/2005 |

(Continued)

OTHER PUBLICATIONS

Yoshikazu Goto etal. "Variable spreading and chip repetion factors (VSCRF)-CDMA in reverse link for broadband wireless access", IEEE, 14th, p. 254259.*

(Continued)

*Primary Examiner* — Chi Pham
*Assistant Examiner* — Fan Ng
(74) *Attorney, Agent, or Firm* — Osha - Liang LLP

(57) ABSTRACT

A receiving apparatus receives control, pilot and data channels in an uplink. The apparatus includes a data-channel receiving unit for receiving the pilot channel in an antenna gain pattern of a multi-beam having multiple fixed directional beams with respectively different fixed directional directions or of a variable directional beam having a directional direction varying in accordance with the position of a mobile terminal; and a data-channel receiving unit for receiving the data channel in an antenna gain pattern of a multi-beam or a variable directional beam.

5 Claims, 39 Drawing Sheets

FOREIGN PATENT DOCUMENTS

| | | |
|---|---|---|
| EP | 1 339 176 | 8/2003 |
| JP | 2003-244054 A | 8/2003 |
| JP | 2003-259454 A | 9/2003 |
| JP | 2005-064546 | 3/2005 |
| TW | 417365 | 1/2001 |
| TW | 490984 | 6/2002 |
| TW | 227975 | 2/2005 |
| WO | 00/55986 | 9/2000 |

OTHER PUBLICATIONS

Taiwanese Office Action for Taiwan Application No. 095110057, mailed on Mar. 20, 2008 (17 pages).
esp@cenet patent abstract for Taiwanese Publication No. 227975, Publication date Feb. 11, 2005 (1 page).
esp@cenet patent abstract for Taiwanese Publication No. 490984, Publication date Jun. 11, 2002 (1 page).
esp@cenet patent abstract for Taiwanese Publication No. 417365, Publication date Jan. 1, 2001 (1 page).
esp@cenet patent abstract for Chinese Publication No. 1585298, Publication date Feb. 23, 2005 (1 page).
Yoshikazu Goto, et al., "Variable Spreading and Chip Repetition Factors (VSCRF)-CDMA in Reverse Link for Broadband Wireless Access," IEICE Technical Report, Jun. 13, 2003, vol. 103, No. 128, RCS2003-67, 8 pages.
International Search Report issued in PCT/JP2006/305512 dated Jun. 27, 2006, with English translation, 4 pages.
Chinese Office Action for Application No. 200680015580.5, mailed on Jan. 26, 2011 (9 pages).
Atarashi et al., "Broadband Wireless Access based on VSF-OFCDM and VSCRF-CDMA and its experiments", European Transactions on Telecommunications; 2004; 15:159-172.
esp@cenet Patent Abstract for Chinese Publication No. 1440212, publication date Sep. 3, 2003. (1 page).

* cited by examiner

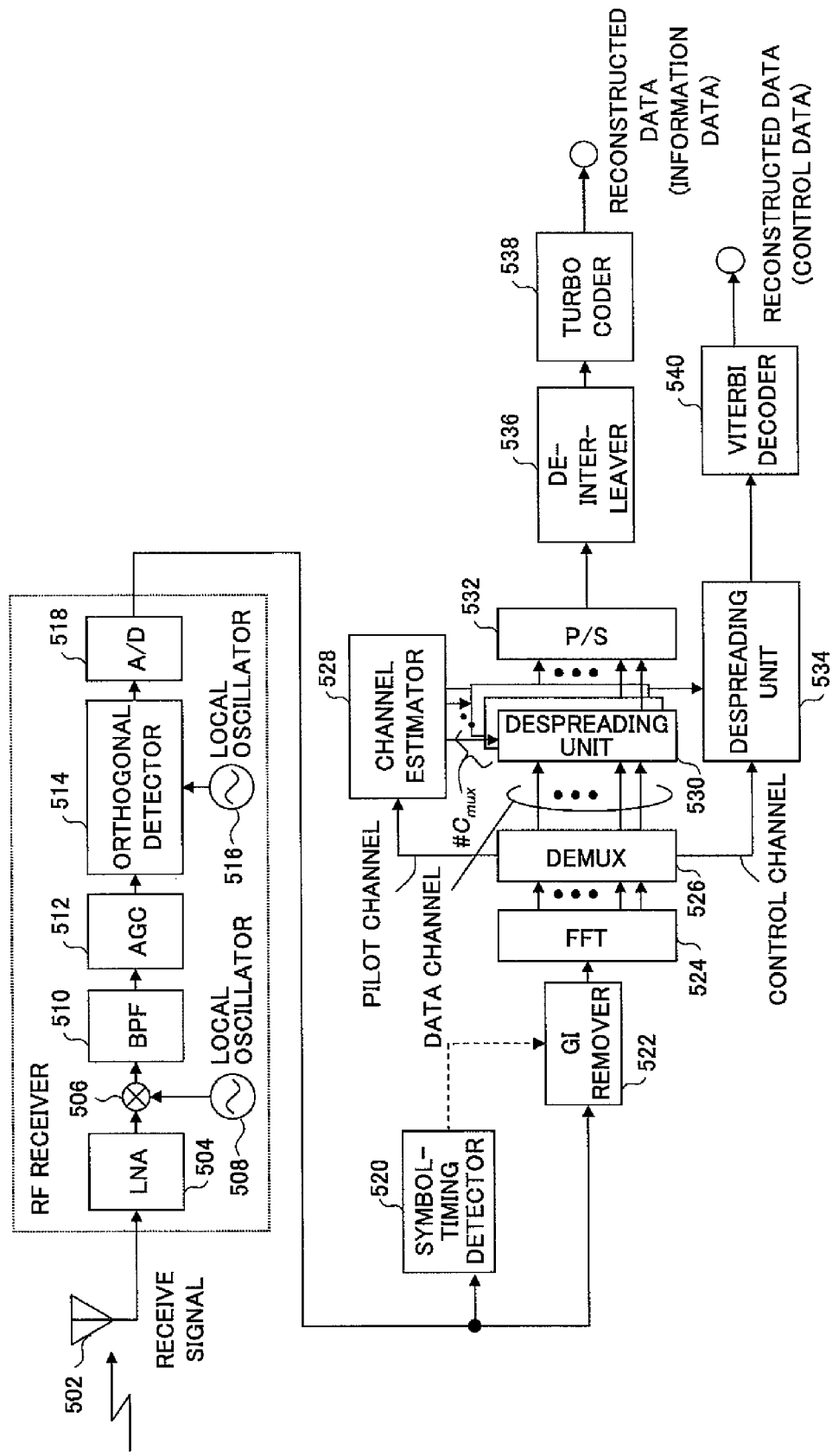

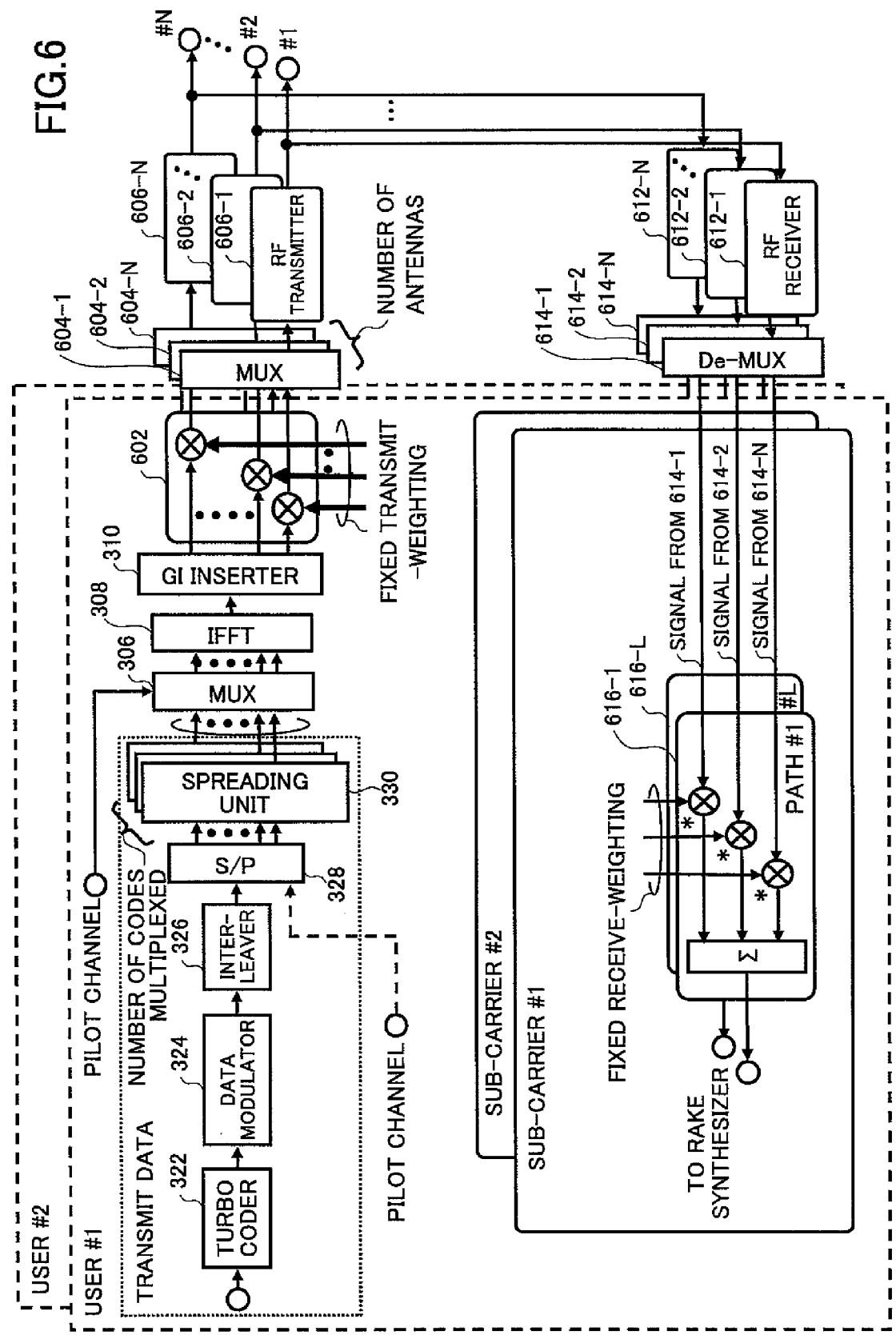

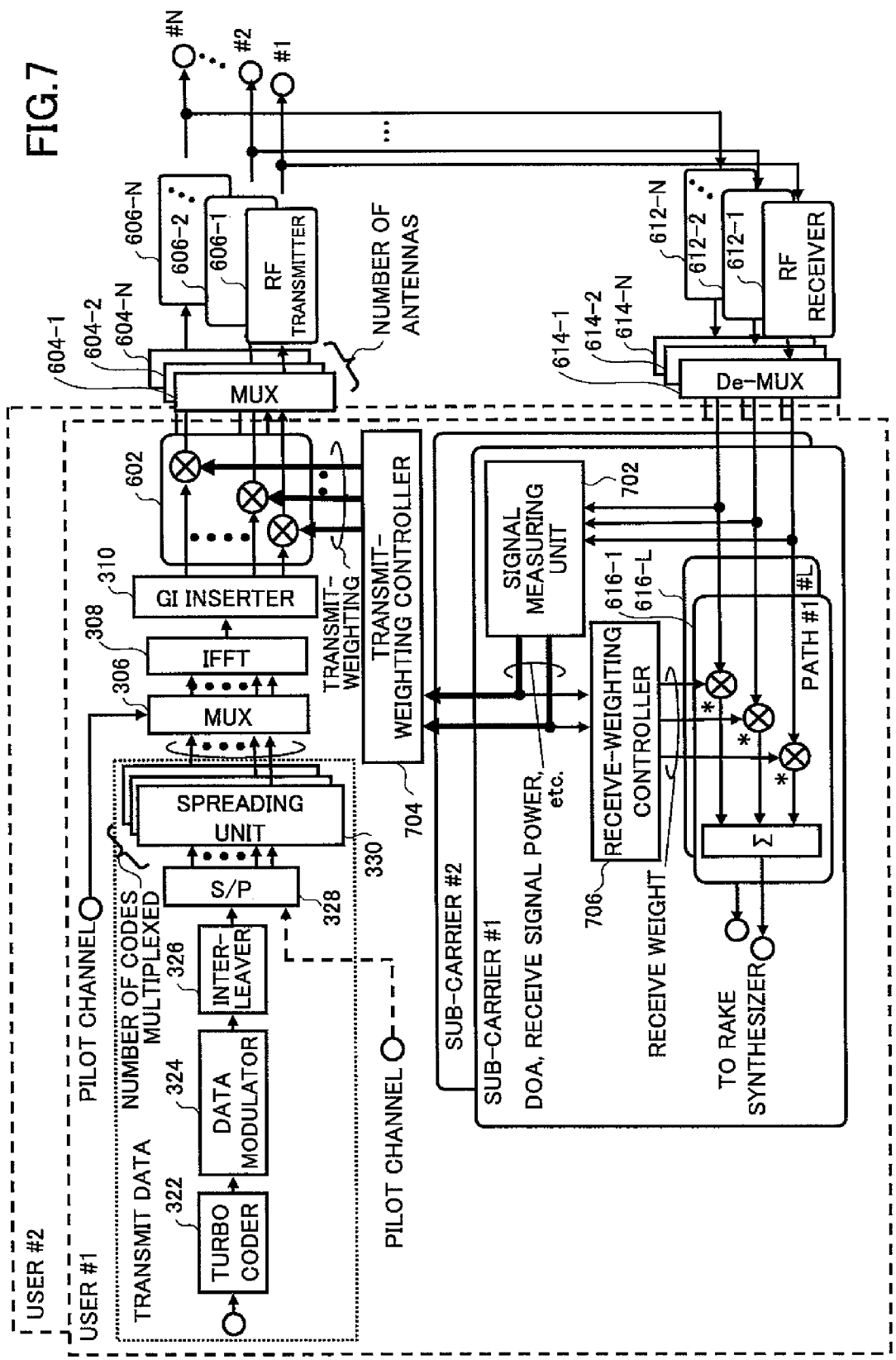

FIG.8

| | RECEIVING SCHEME 1 | RECEIVING SCHEME 2 | RECEIVING SCHEME 3 | RECEIVING SCHEME 4 |
|---|---|---|---|---|
| COMMON CONTROL CHANNEL | SECTOR BEAM | SECTOR BEAM | MULTI-BEAM/ SWITCHED BEAM | MULTI-BEAM/ SWITCHED BEAM |
| ASSOCIATED CONTROL CHANNEL | SECTOR BEAM | SECTOR BEAM | MULTI-BEAM/ SWITCHED BEAM | MULTI-BEAM/ SWITCHED BEAM |
| SHARED PACKET DATA CHANNEL | MULTI-BEAM/ SWITCHED BEAM | ADAPTIVE DIRECTIONAL BEAM | MULTI-BEAM/ SWITCHED BEAM | ADAPTIVE DIRECTIONAL BEAM |
| DEDICATED PACKET DATA CHANNEL | MULTI-BEAM/ SWITCHED BEAM | ADAPTIVE DIRECTIONAL BEAM | MULTI-BEAM/ SWITCHED BEAM | ADAPTIVE DIRECTIONAL BEAM |
| PILOT CHANNEL | SECTOR BEAM/ MULTI-BEAM/ SWITCHED BEAM | SECTOR BEAM/ ADAPTIVE DIRECTIONAL BEAM | MULTI-BEAM/ SWITCHED BEAM | MULTI-BEAM/ SWITCHED BEAM ADAPTIVE DIRECTIONAL BEAM |

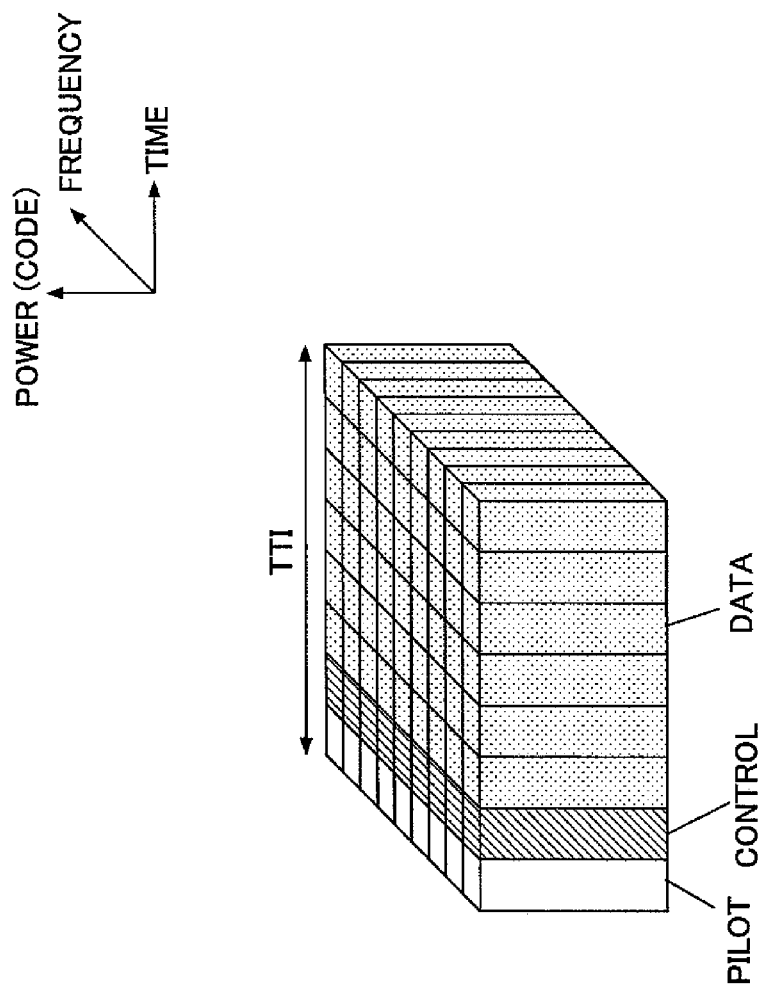

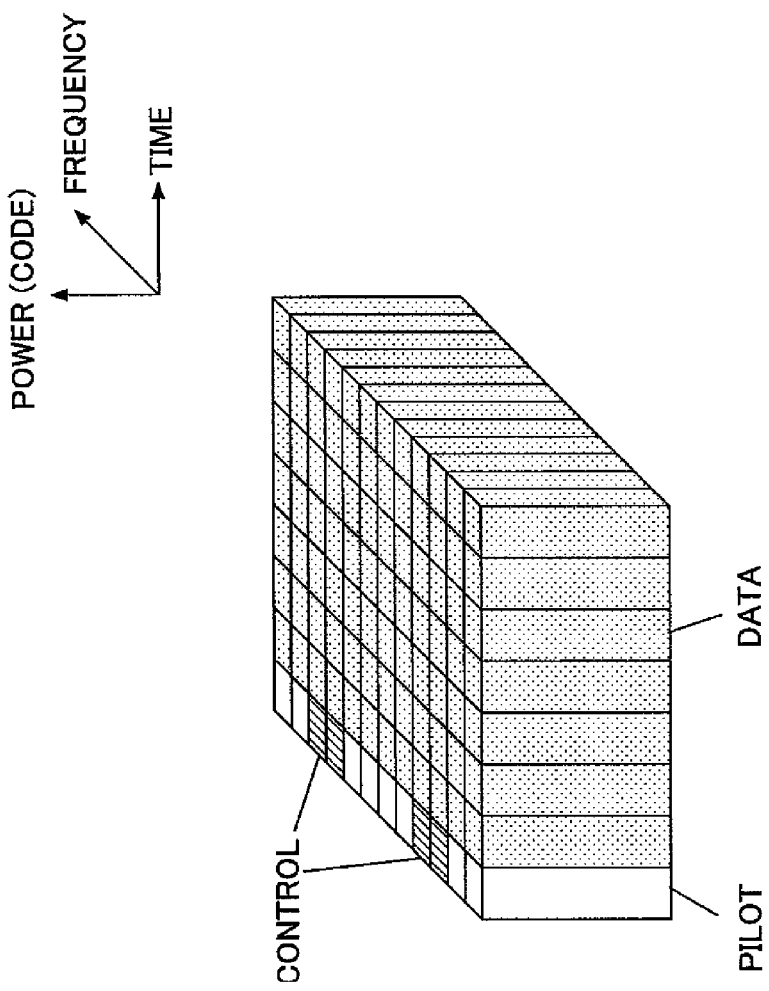

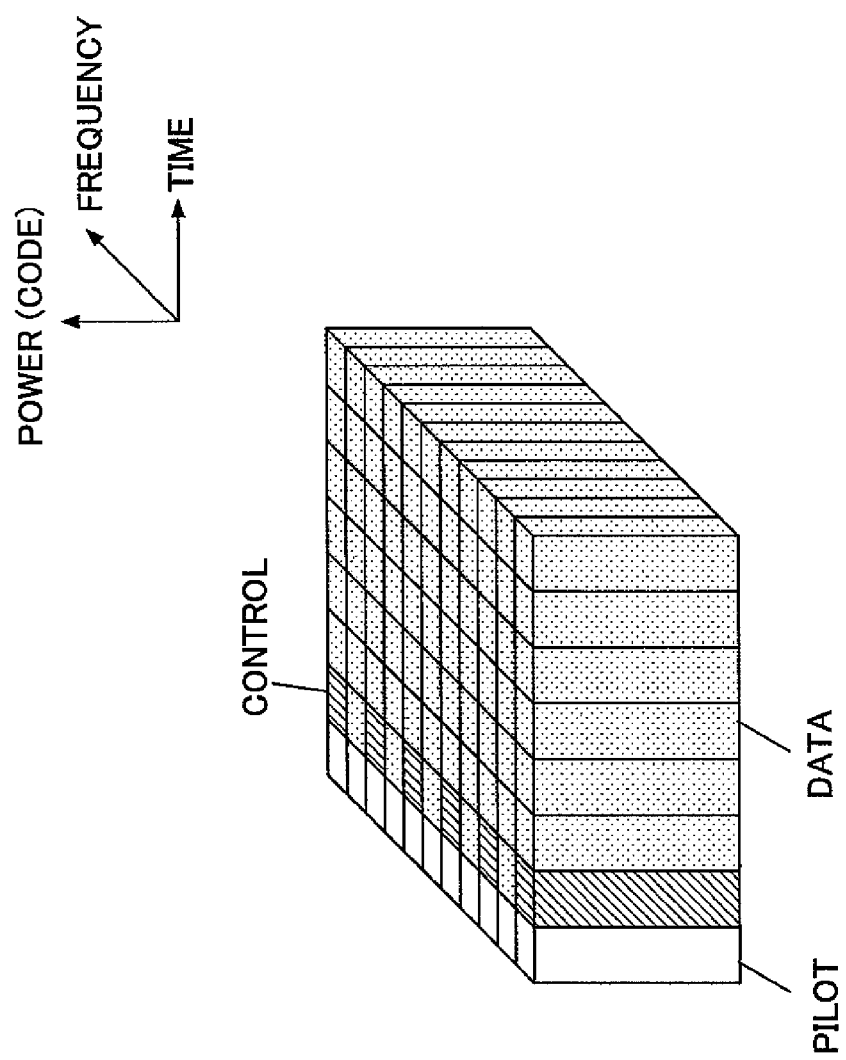

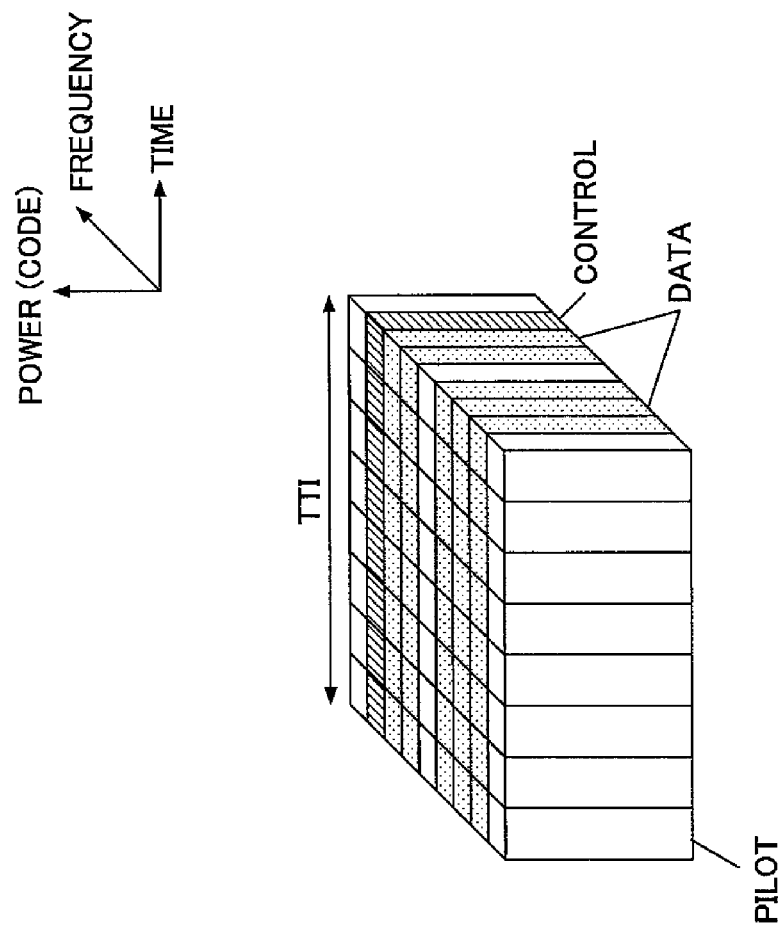

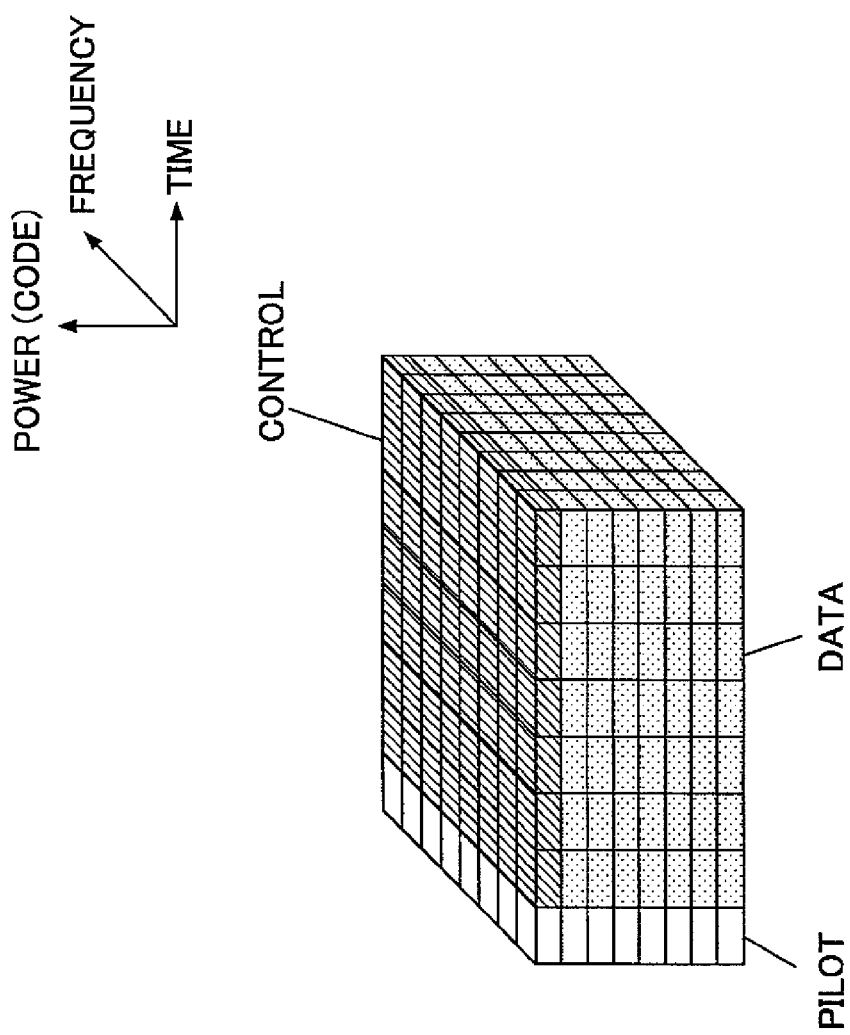

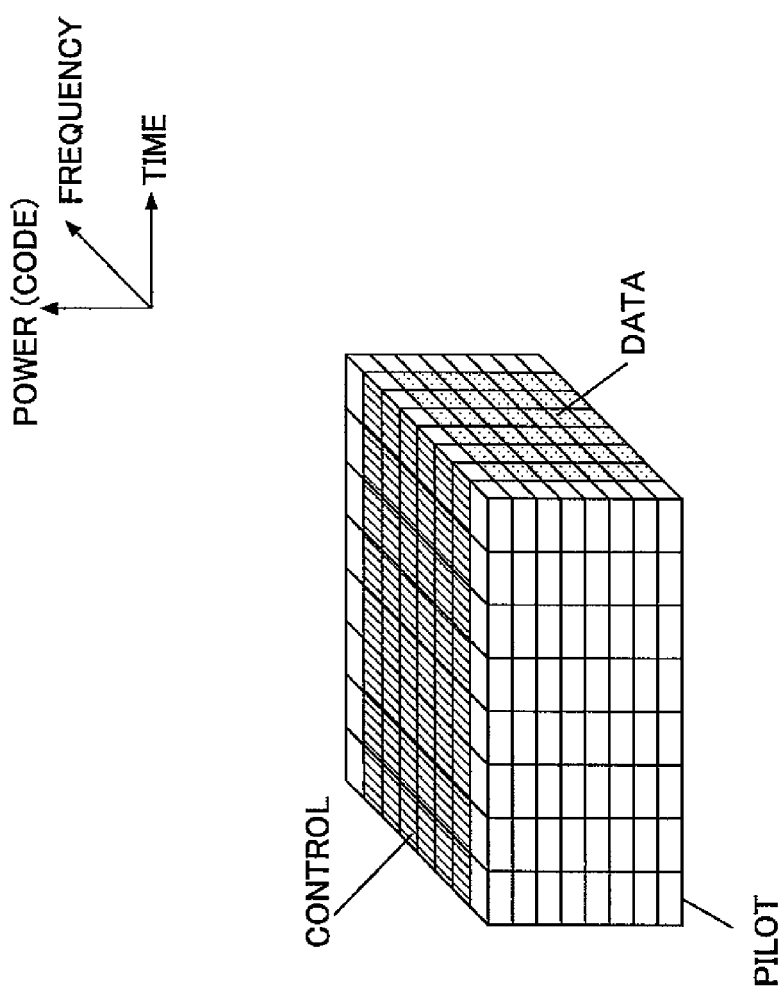

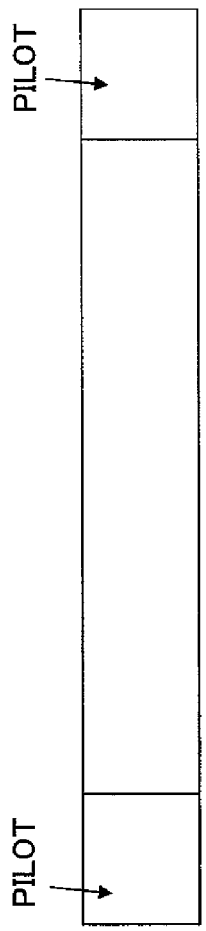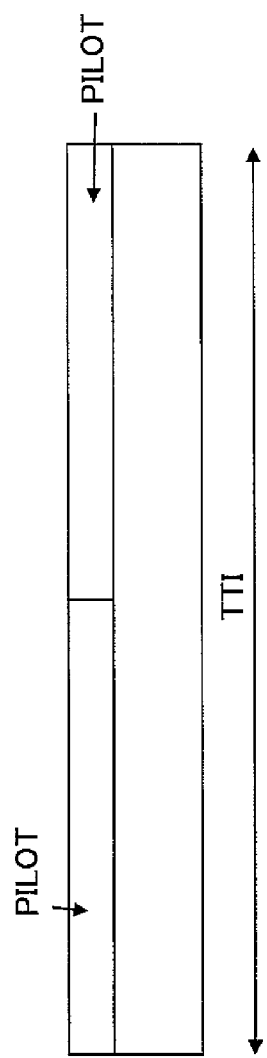
FIG.20A  TIME-MULTIPLEXED PILOT CHANNEL
FIG.20B  CODE-MULTIPLEXED PILOT CHANNEL

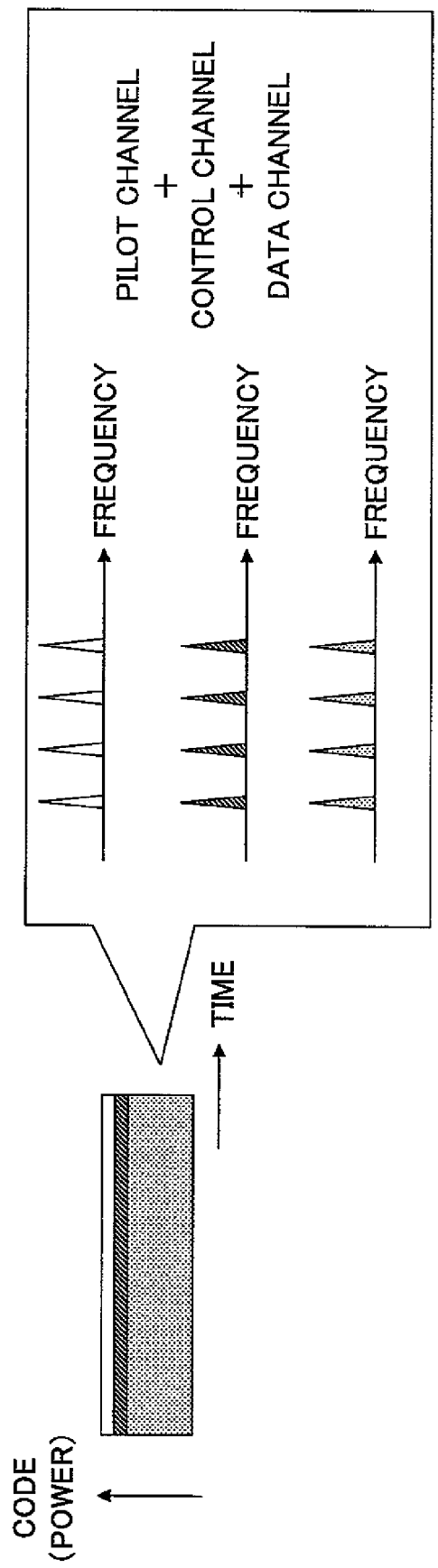

UPLINK CHANNEL RECEIVING AND TRANSMITTING APPARATUSES AND METHODS

BACKGROUND OF THE INVENTION

1. Field of the Invention

The present invention relates generally to wireless communications, and more specifically to uplink channel receiving apparatuses and methods.

2. Description of the Related Art

In a third generation telecommunications scheme as represented by IMT-2000 (International Mobile Telecommunications-2000), there is special demand for an increased speed and capacity for downlink. As an example, 2 Mbps information transmission rate has been realized using a 5 MHz frequency band. However, for future telecommunications systems, there is demand for a further increase in transmission rate and capacity, and in cost reduction. Moreover, it is necessary to improve signal quality in uplink. Furthermore, it is also necessary to decrease power consumption of mobile terminals. Improving channel configuration in a telecommunications system to achieve higher quality in signal transmission is disclosed in Patent Document 1.

Patent Document 1

JP2003-259454A

SUMMARY OF THE INVENTION

Problem(s) to be Solved by the Invention

A problem to be solved by the present invention is to provide receiving apparatuses and methods which make it possible to improve uplink-channel transmission quality.

Means for Solving the Problem

The present invention uses a receiving apparatus for receiving in an uplink, control, pilot, and data channels. The apparatus according to the present invention includes a pilot-channel receiving unit for receiving a pilot channel in an antenna gain pattern of a multi-beam having multiple fixed directional beams with respectively different fixed directional directions or of a variable directional beam having a directional direction varying in accordance with the position of a mobile terminal; and a data-channel receiving unit for receiving an antenna gain pattern of a multi-beam or a variable directional beam.

Advantage of the Invention

The present invention makes it possible to improve the uplink-channel transmission quality.

BRIEF DESCRIPTION OF THE DRAWINGS

FIG. 5 illustrates a schematic block diagram of a receiver for receiving a sector beam;

FIG. 6 illustrates a schematic block diagram of a base station used in transmitting and receiving a multi-beam;

FIG. 7 illustrates a schematic block diagram of a base station used in transmitting and receiving an adaptive directional beam;

FIG. 8 illustrates a table showing downlink transmission schemes realized according to one embodiment of the present invention;

FIG. 12A illustrates a diagram of a first example of multiplexing pilot, control, and data channels;

FIG. 13A illustrates a diagram of a second example of multiplexing pilot, control, and data channels;

FIG. 13B illustrates another diagram of the second example of multiplexing pilot, control, and data channels;

FIG. 14B illustrates another diagram of the third example of multiplexing pilot, control, and data channels;

FIG. 15A illustrates a diagram of a fourth example of multiplexing pilot, control, and data channels;

FIG. 15B illustrates another diagram of the fourth example of multiplexing pilot, control, and data channels;

FIG. 20A illustrates a diagram of positions at which pilot channels are inserted;

FIG. 20B illustrates another diagram of positions at which pilot channels are inserted;

FIG. 28 illustrates a diagram of an eighth example of multiplexing to a chip-repeated data channel.

DESCRIPTION OF THE PREFERRED EMBODIMENTS

Figure 1:
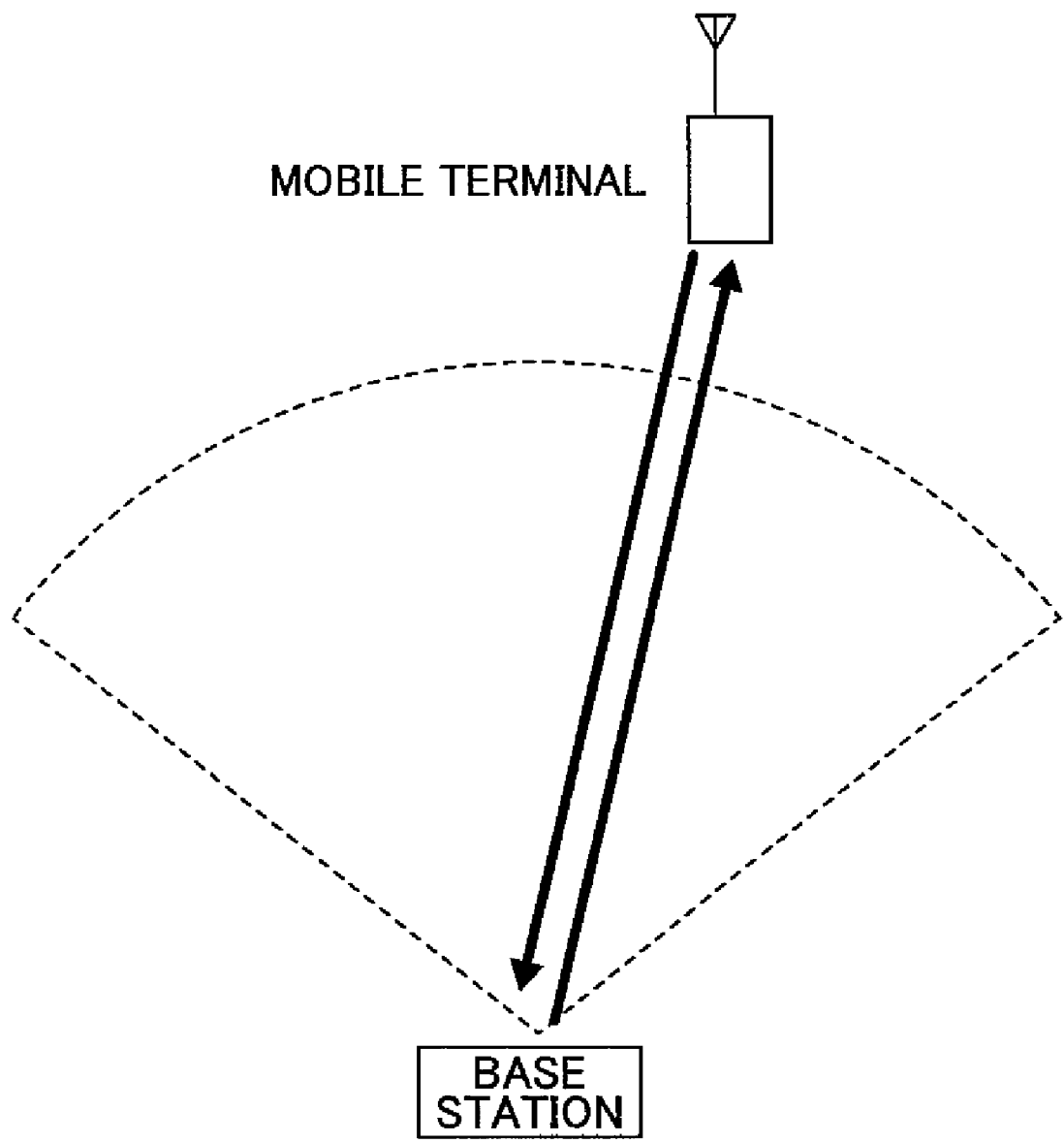
FIG. 1 illustrates a view for explaining a sector beam.

Description of Notations 302-1 to $N_D$ data-channel processors; 304 control-channel processor; 306 multiplexer; 308 fast inverse Fourier transformer; 310 guard-interval inserter; 312 digital-to-analog converter (D/A); 322 turbo coder; 324 data modulator; 326 interleaver; 328 serial-to-parallel converter (S/P); 330 spreading unit; 342 convolution coder; 344 QPSK modulator; 346 interleaver; 348 serial-to-parallel converter (S/P); 350 spreading unit;

402 orthogonal modulator; 404 local oscillator; 406 band-pass filter; 408 mixer; 410 local oscillator; 412 band-pass filter; 414 power amplifier;

502 antenna; 504 low-noise amplifier; 506 mixer; 508 local oscillator; 510 band-pass filter; 512 automatic gain controller; 514 orthogonal detector; 516 local oscillator; 518 analog-to-digital converter; 520 symbol-timing detector; 522 guard-interval remover; 524 fast Fourier transformer; 526 demultiplexer; 528 channel estimator; 530 de-spreading unit; 532 parallel-to-serial converter (P/S); 534 de-spreading unit; 536 de-interleaver; 538 turbo coder; 540 Viterbi decoder;

602 transmit-weighting setting unit; 604-1 to N multiplexers; 606-1 to N RF transmitters; 612-1 to N RF receivers; 614-1 to N separators; 616-1 to L receive-weighting setting units;

702 signal measuring unit; 704 transmit-weighting controller; 706 receive-weighting controller;

902 turbo coder; 904 data modulator; 906 spreading and multiplexing unit; 908 spreading unit; 910 data-channel spreading unit; 912 multiplexer; 914 band-limiting filter; 916 synthesizer; 918 digital-to-analog converter; 920 RE transmitter;

1002 REF receiver; 1004 analog-to-digital converter; 1006 de-spreading and separating unit; 1007 mixer; 1008 band-limiting filter; 1010 path searcher; 1012 de-spreading unit; 1014 channel estimator; 1016 rake synthesizer; 1018 synthesizer; 1020 turbo decoder;

1602 spreading unit; 1612, 1614 multiplying unit; 1604 iterative synthesizer; 1606 phase shifter;

1702 phase shifter; 1704 iterative synthesizer; 1706 de-spreading unit;

1802 pre-compression data sequence; 1804 compressed and repeated data sequence; 1806 uplink frequency spectrum for all mobile terminals

BEST MODE OF CARRYING OUT THE INVENTION

According to an aspect of the present invention, a pilot channel is received in an antenna-gain pattern of a multi-beam including multiple fixed directional beams having respectively different fixed directional directions or of a variable directional beam having a directional direction varying in accordance with the position of a mobile terminal. Then, a data channel is received in an antenna-gain pattern of a multi-beam or of a variable directional beam.

According to an aspect of the present invention, weighting factors for the variable directional beam may be weighting factors for an adaptive directional beam that are adaptively calculated in accordance with the position of a mobile terminal.

According to an aspect of the present invention, a variable directional beam is generated by switching one or more fixed directional beams.

At least data and pilot channels are received in an antenna-gain pattern realizing a directional beam directed in a direction of a mobile terminal (switching fixed directional beams, or an adaptive directional beam), making it possible to improve the quality of uplink transmission from the mobile terminal.

According to an aspect of the invention, a control channel is received in an antenna-gain pattern of a multi-beam or of a variable directional beam. This makes it possible to eliminate the necessity of receiving a signal in a sector beam and to reduce the types of beams provided (ie., can be limited to a multi-beam and a variable directional beam).

According to an aspect of the present invention, control, pilot and data channels are demodulated with Direct Sequence-Code Division Multiple Access (DS-CDMA).

According to an aspect of the present invention, a receive signal is time-extended and de-spread such that a data channel is demodulated with Variable Spreading and Chip Repetition Factors-Code Division Multiple Access (VSCRF-CDMA).

According to an aspect of the present invention, time-multiplexed pilot and data channels are separated into respective time periods, with time-multiplexed control and data channels also separated into respective time periods.

According to an aspect of the present invention, one of time-multiplexed pilot and data channels and time-multiplexed data channels are separated into respective time periods, the other channels are frequency-multiplexed, and time-multiplexed data channels are separated into respective frequencies.

According to an aspect of the present invention, code-multiplexed pilot and control channels are separated into respective codes, and the frequency-multiplexed or code-multiplexed control and data channels are separated into respective frequencies or codes.

According to an aspect of the present invention, frequency-multiplexed or code-multiplexed pilot, control and data channels are separated into respective frequencies or codes.

A transmitter according to an aspect of the present invention transmits pilot, control and data channels in an uplink. The transmitter has means for code-spreading, compressing, and repeating using Variable Spreading and Chip Repetition Factors-Code Division Multiple Access (VSCRF-CDMA). The transmitter has means for code-spreading, compressing, repeating, and phase-shifting at least one of pilot and control channels using Variable Spreading and Chip Repetition Factors-Code Division Multiple Access (VSCRF-CDMA). The transmitter also transmits one of pilot and control channels using Variable Spreading and Chip Repetition Factors-Code Division Multiple Access (VSCRF-CDMA). This makes it possible to set respective mobile terminal uplink channels to be orthogonal on a frequency axis not only for data channels, but also for pilot and/or control channels.

A transmitter according to an aspect of the invention has means for time-multiplexing pilot and data channels, and also control and data channels.

A transmitter according to an aspect of the invention has means for time-multiplexing with data channels one of pilot and control channels, and frequency-multiplexing with data channels the other channels.

A transmitter according to an aspect of the present invention has means for code-multiplexing pilot and control channels and frequency-multiplexing or code-multiplexing control and data channels.

A transmitter according to an aspect of the present invention has means for frequency-multiplexing or code-multiplexing pilot, control and data channels.

Embodiment 1

Beams

In an embodiment of the present invention, various types of channels in a downlink are transmitted from a base station to a mobile terminal using at least four types of beams including: (1) a sector beam; (2) a multi-beam; (3) a switched beam; and (4) an adaptive directional beam.

(1) A sector beam is a directional beam realizing an antenna-gain pattern across a cell or sector served by a base station. FIG. 1 shows in broken lines (an antenna-gain pattern of) a sector beam across a sector having a 120 degree range.

Figure 2:
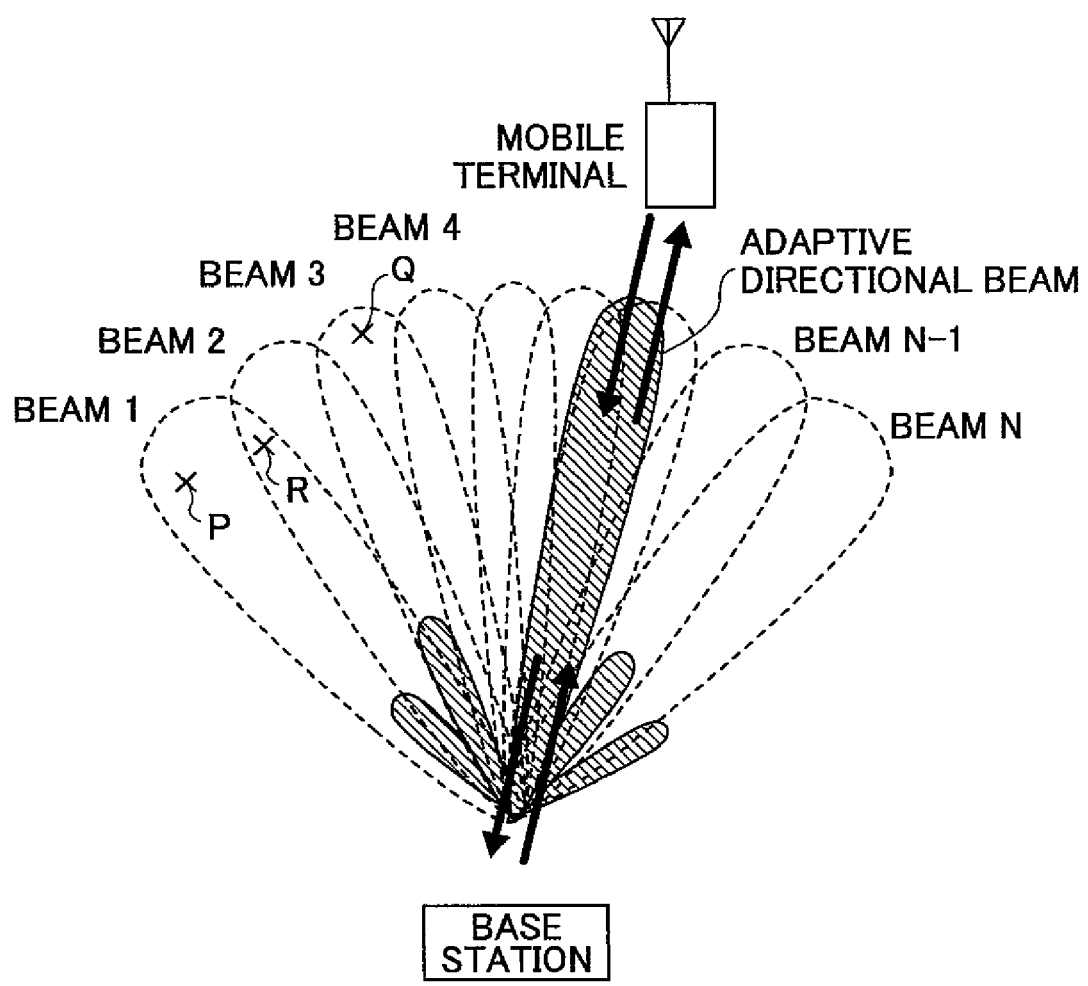
FIG. 2 illustrates a view for explaining a multi-beam and an adaptive directional beam.

(2) A multi-beam includes multiple fixed directional beams having respectively different fixed directional directions. The number of beams is set such that the multiple fixed directional beams cover one sector. FIG. 2 shows how one sector is covered with N fixed directional beams as shown in broken lines.

(3) A switched beam is a directional beam (may be called a switched directional beam) generated by switching, in accordance with the position of a mobile terminal, one or more fixed directional beams included in a multi-beam. For example, when a mobile terminal moves from point P to Q in FIG. 2, the switched beam is equivalent to beam 1 initially, but is subsequently switched to beam 3. Moreover, for a mobile terminal nearly equidistant from beams 1 and 2 (eg., at point R), a switched beam for the mobile terminal may be formed with a directional beam, the directional beam being formed by combining beams 1 and 2.

(4) With an adaptive directional beam, weighting factors set for each antenna to realize the beam are adaptively calculated in accordance with the position of a mobile terminal. The switched beam, while being common to the adaptive directional beam in that the directional direction varies with the position of the mobile terminal, differs from the adaptive directional beam where beam weightings are not preset and thus are calculated one by one. FIG. 2 shows in solid lines an adaptive directional beam.

Apparatus Features

Figure 3:
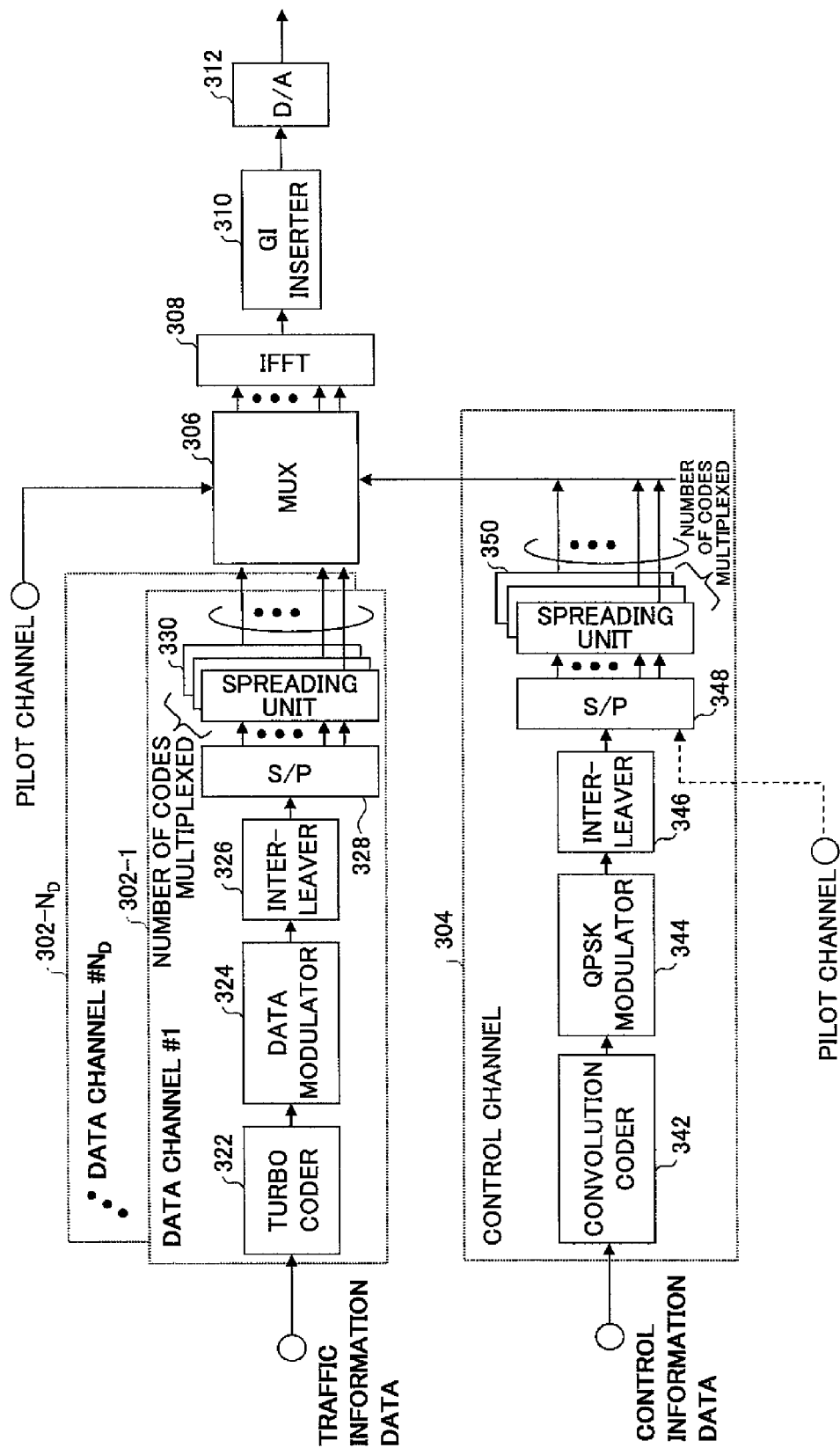
FIG. 3 illustrates a first schematic block diagram of a transmitter for transmitting a sector beam.

FIG. 3 is a first schematic block diagram of a transmitter for transmitting a sector beam. Typically provided in a base station, such transmitter as shown may be provided in a mobile terminal. A base station is used in an Orthogonal Frequency Code Division Multiplexing (OFCDM) communication system. The base station includes: $N_D$ data-channel processors 302-1 to $N_D$; a control channel processor 304; a multiplexer 306; a fast inverse Fourier transformer 308; a guard interval inserter 310; and a digital-to-analog (D/A) converter 312. The 302-1 data-channel processor will be described below as representing the $N_D$ data-channel processors 302-1 to $N_D$, all having the same features and functions. The data-channel processor 302-1 includes: a turbo coder 322; a data modulator 324; an interleaver 326; a serial-to-parallel (S/P) converter 328; and a spreading unit 330. The control-channel processor 304 includes a convolution coder 342; a QPSK modulator 344; an interleaver 346; a serial-to-parallel (S/P) converter 348; and a spreading unit 350. In other embodiments where Orthogonal Frequency Division Multiplexing (OFDM) with no code spreading is adopted, the spreading units 330 and 350 are omitted.

$N_D$ data-channel processors 302-1 to $N_D$ provide baseband processing for transmitting traffic information data using OFCDM. The turbo coder 322 provides coding for increasing error resilience of traffic information data. The data modulator 324 modulates the traffic information data using an appropriate modulation scheme such as QPSK, 16 QAM, and 64 QAM. The-above-mentioned modulation scheme is appropriately changed when performing Adaptive Modulation and Coding (AMC). The interleaver 326 changes the order of the traffic information data in accordance with a predetermined pattern. The serial-to-parallel (S/P) converter 328 converts a serial signal stream to a parallel signal stream. The number of parallel signal streams may be determined in accordance with the number of sub-carriers. The spreading section 330 performs code spreading by multiplying a predetermined spread code and each parallel signal stream. In the embodiment, two-dimensional spreading is performed such that a signal is spread in the time and/or frequency directions.

The control-channel processor 304 provides baseband processing for transmitting control information data using OFCDM. The convolution coder 342 provides coding for increasing error resilience of traffic information data. The QPSK modulator 344 modulates control information data using a QPSK modulation scheme. While any appropriate modulation scheme may be adapted, a QPSK modulation scheme having a small modulation multi-value number is used in the embodiment due to a relatively small information amount of control information data. The interleaver 346 changes the order of the traffic information data in accordance with a predetermined pattern. The serial-to-parallel (S/P) converter 348 converts a serial signal stream to a parallel signal stream. The number of parallel signal streams may be determined in accordance with the number of sub-carriers. The spreading section 350 performs code spreading by multiplying a predetermined spread code and each parallel signal stream.

The multiplexer 306 multiplexes processed traffic and control information data. The multiplexing may be either of time, frequency, or code multiplexing. In the embodiment, to the multiplexer 306 is input a pilot channel which is also multiplexed. In other embodiments, a pilot channel is input to the serial-to-parallel converter 348, and is multiplexed in the frequency axis direction (to be described below) as shown in broken lines.

The fast inverse Fourier transformer 308 fast inverse Fourier transforms a signal input therein, and modulates the signal using OFDM.

The guard interval inserter 310 adds a guard interval to the modulated signal to produce an OFDM symbol. As well known in the art, a guard interval is obtained by copying a part of the beginning or the end of a transmit symbol.

The digital-to-analog converter (D/A) 312 converts a baseband digital signal to an analog signal.

Figure 4:
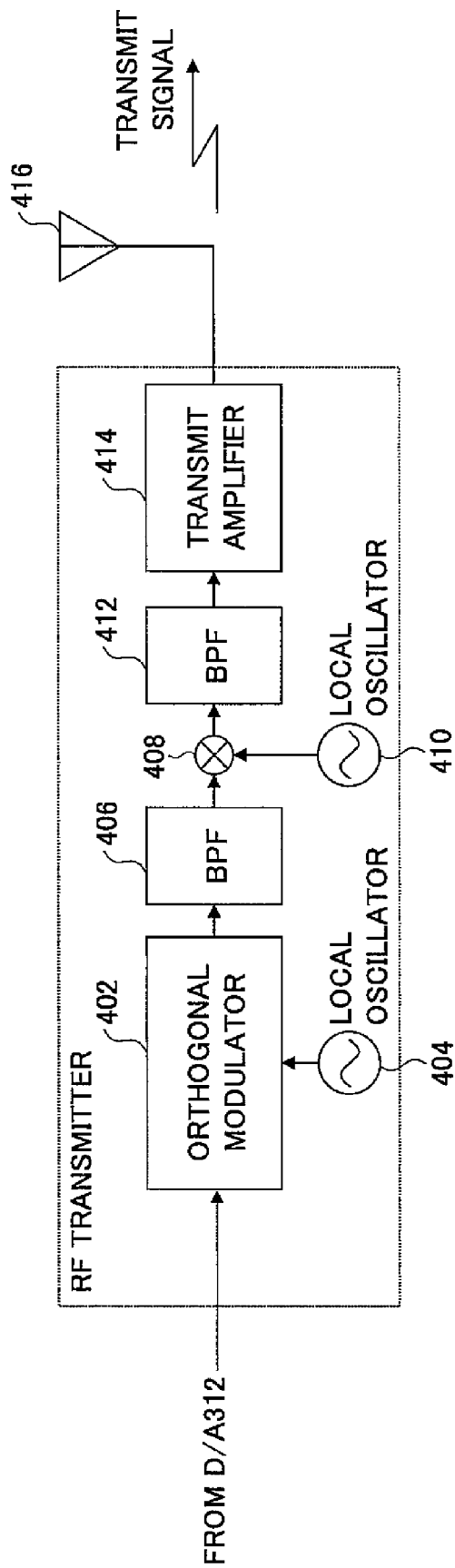
FIG. 4 illustrates a second schematic block diagram of a transmitter for transmitting a sector beam.

FIG. 4 illustrates a second schematic block diagram of a transmitter for transmitting a sector beam, representing a portion (a RF transmitter) beyond the digital-to-analog converter 312 in FIG. 3. The RF transmitter includes: an orthogonal modulator 402; a local oscillator 404; a band-pass filter 406; a mixer 408; a local oscillator 410; a band-pass filter 412; and a power amplifier 414.

The orthogonal modulator 402 generates from a signal input thereto in-phase (I) and quadrature (Q) intermediate-frequency components. The band-pass filter 406 removes unwanted frequency components in an intermediate frequency band. The mixer 408 up-converts an intermediate-frequency signal to a high-frequency signal using the local oscillator 410. The band-pass filter 412 removes unwanted frequency components. The power amplifier 414 amplifies the power of a signal for wireless transmission from an antenna 416.

Traffic information data are coded in the turbo coder 322, modulated in the data modulator 324; the order of the traffic information data is changed in the interleaver 326; the traffic information data are parallelized in the serial-to-parallel converter 328 and spread per sub-carrier component in the spreading unit 330. Control information data are similarly coded, modulated, interleaved, and spread per sub-carrier component. The spread data and control channels are multiplexed in the multiplexer 326 per sub-carrier, and OFDM modulated in the fast inverse Fourier transformer 308. A guard interval is added to the modulated signal, and a baseband OFDM symbol is output. The baseband signal is converted to an analog signal, orthogonally modulated in the orthogonal modulator 402 of the RF processor, band-limited, and then appropriately amplified for wireless transmission.

FIG. 5 illustrates a schematic block diagram of a receiver for receiving a sector beam. Such a receiver typically provided in a mobile terminal may be provided in a base station. The receiver described as receiving a sector beam may be used for receiving other beams for the convenience of explanation. The mobile terminal includes an antenna 502; a low-noise amplifier 504; a mixer 506; a local oscillator 508; a band-pass filter 510; an automatic-gain controller 512; an orthogonal detector 514; a local oscillator 516; an analog-to-digital converter 518; a symbol-timing detector 520; a guard-interval remover 522; a fast Fourier transformer 524; a demultiplexer 526; a channel estimator 528; a de-spreading unit 530; a parallel-serial converter (P/S) 532; a de-spreading unit 534; a de-interleaver 536; a turbo decoder 538; and a Viterbi decoder 540.

The low-noise amplifier 504 appropriately amplifies a signal received with the antenna 502. The amplified signal is converted to an intermediate frequency (down-converted) with the mixer 506 and the local oscillator 508. The band-pass filter 510 removes unwanted frequency components. The automatic-gain controller 512 controls amplifier gain such that the signal level is appropriately maintained. The orthogonal detector 514 orthogonally demodulates using the local oscillator 516 based on the received signal In-phase (I) and Quadrature (Q) components. The analog-to-digital converter 518 converts an analog signal to a digital signal.

The symbol-timing detector 520 detects a symbol (symbol boundary) timing based on the digital signal.

The guard-interval remover 522 removes from a received signal a portion corresponding to a guard interval.

The fast Fourier transformer 524 fast Fourier transforms a signal input, and demodulates the signal using OFDM.

The demultiplexer 526 separates pilot, control, and data channels multiplexed to a signal received. The separating is performed such that it corresponds to multiplexing at the transmitter (the process in the multiplexer 306 in FIG. 3).

The channel estimator 528 estimates propagation path conditions using a pilot channel and outputs a control signal for adjusting amplitude and phase such that channel fluctuation is compensated for. The control signal is output per sub-carrier.

The de-spreading unit 530 de-spreads, per sub-carrier, a channel-compensated data channel. A code multiplexing number is set as $C_{mux}$.

The parallel-to-serial (P/S) converter 532 converts a parallel signal stream to a serial signal stream.

The de-spreading unit 534 de-spreads, per sub-carrier, a channel-compensated control channel.

The de-interleaver 536 changes the order of signals in accordance with a predetermined pattern. The predetermined pattern corresponds to an inverse pattern of the change performed in the interleaver at the transmitter (326 in FIG. 3).

The turbo decoder 538 and Viterbi decoder 540 respectively decode traffic information data and control information data.

A signal received with an antenna undergoes processes within the RF receiver such as amplifying, frequency-converting, band-limiting, and orthogonal demodulating, and then is converted to a digital signal. A guard-interval removed signal is OFDM demodulated with the fast Fourier transformer 524. The demodulated signal is separated in the separator 526 to the respective pilot, control, and data channels. The pilot channel is input to the channel estimator from which a control signal for compensating propagation path fluctuation is output. The data channel is compensated for using the control signal, de-spread per sub-carrier, and converted to a serial signal. The order of the converted signal is changed in the de-interleaver 526 in a pattern inverse to the change applied in the interleaver. The signal is then decoded in the turbo decoder 538. Similarly, the control channel is also compensated for channel fluctuation using the control signal, de-spread, and, in the Viterbi decoder 540, decoded. Thereafter, signal processing is performed that uses reconstructed data and control channels.

FIG. 6 illustrates a schematic block diagram of a base station used in transmitting and receiving a multi-beam. Such transmitter and receiver typically provided in a base station may be provided in a mobile terminal. The same reference letter is assigned to an element already described in conjunction with FIG. 3 and will not be explained further. In FIG. 6, processing elements related to a control channel are omitted. FIG. 6 shows a transmit-weighting setting unit 602; N multiplexers 604-1 to N, where N is the number of antennas; N RF transmitters 606-1 to N; N RF receivers 612-1 to N; N separators 614-1 to N; and L receive-weighting setting units 616-1 to L.

The transmit-weighting setting unit 602 multiplies respective transmit weightings (weighting factors) and signals transmitted from N antennas. The transmit-weightings are fixed weightings provided in advance so as to realize a multi-beam.

The N multiplexers 604-1 to N combine, per antenna, transmit signals. For example, the multiplexer 604-1 collects from $N_D$ data-channel processors signals for transmitting from a first antenna, and combines the signals. The multiplexer 604-2 collects from $N_D$ data-channel processors signals for transmitting from a second antenna, and combines the signals.

The N RF transmitters 606-1 to N perform per antenna a process for wirelessly transmitting a signal. The process which is generally the same as what is described in conjunction with FIG. 4 includes frequency converting, band-limiting, and power amplifying.

The N RF receivers 612-1 to N, performing operations which are generally the inverse of the operations at the RF transmitter, convert signals received with N antennas to signals appropriate for baseband processing.

The N separators 614-1 to N, performing operations which are generally the inverse of the operations at the multiplexers as described above, distribute signals input therein to $N_D$ data-channel processors.

The L receive-weighting setting units 616-1 to L multiply receive weightings and signals received from N antennas and combine the signals. This process is performed per path. In the embodiment, L multi-path propagation paths are contemplated. The combined signal per path is provided to a rake synthesizer (not shown). The processes as described above are performed per sub-carrier. Similar to the transmit-weightings, the receive-weightings are fixed weightings provided in advance so as to realize a multi-beam. The transmit and receive weightings may be identical or different. For example, for using the same frequency for transmitting and receiving, the same weightings may be used for transmitting and receiving as it is expected that the uplink and downlink propagation path conditions are similar. Conversely, when different frequencies are used for uplink and downlink, different weightings may be used as uplink and downlink propagation path conditions may differ.

The processing elements shown in FIG. 6 are used also when a base station uses a switched beam for transmitting and receiving. In the case as described above, transmit and receive weightings, and multiplexers and separators differ. As described above, a switched beam represents one or more fixed directional beams included in a multi-beam. Therefore, a transmit weighting for realizing a switched beam for a mobile terminal #1 is a transmit weighting for a fixed directional beam (with a directional direction of $\theta_1$, for example) corresponding to the mobile terminal #1. The transmit-weighting is set in the transmit-weighting multiplying unit 602 within the first data-channel processor 302-1. A transmit weighting for realizing a switched beam for a mobile terminal #2 is a transmit weighting for a fixed directional beam (with a directional direction of $\theta_2$, for example) corresponding to the mobile terminal #2. The transmit-weighting is set in the transmit-weighting multiplying unit 602 within the second data-channel processor 302-2. When using switched beams, they are switched per mobile terminal. Therefore, the multiplexers 604-1 to N output only a signal related to a first mobile terminal at one moment, and only a signal related to a second mobile terminal at another moment. The same process is performed for other mobile terminals as well. In this way, a switched beam related to a first mobile terminal is transmitted at one moment, a switched beam related to a second mobile terminal is transmitted at another moment, and so on, such that switched beams are time-division switched.

For receiving, a process is performed generally in reverse of the above-described process for transmitting. In other words, the separator provides signals input therein at one moment to an element for performing a process related to the first mobile terminal (typically, the data-channel processor 302-1), and provides signals input therein at another moment to an element for performing a process related to the second mobile terminal (typically, the data-channel processor 302-2), and so on. Within the data-channel processors, receive weightings are multiplied by signals received with the respective antennas. The receive-weightings are weightings for realizing a switched beam corresponding to a mobile terminal.

FIG. 7 is a schematic block diagram of a base station used in transmitting and receiving an adaptive directional beam. Similar to the transmitter and receiver in FIG. 6, the transmitter and receiver as shown, typically provided in a base station, may be provided in a mobile terminal. The same reference letter is assigned to an element already described in conjunction with FIGS. 3 and 6 which will not be explained further. As described above, with an adaptive directional beam, the directional direction adaptively changes in accordance with the position of a mobile terminal. The changes as described above are continuous rather than discrete changes among multiple fixed directional beams. FIG. 7 illustrates a signal measuring unit 702, a transmit-weighting controller 704, and a receive-weighting controller 706.

The signal measuring unit 702 measures the receive power and incoming direction of a signal received from each antenna, and outputs the measured values to the transmit-weighting and receive-weighting controllers 704, 706.

The transmit-weighting controller 704 adjusts, based on the measured values, the transmit-weightings such that signal quality is further improved. An algorithm for performing the adjusting as described above may be any appropriate optimization algorithm for an adaptive array antenna (AAA). For example, transmit weightings may be updated one by one such that any evaluation function related to receive-signal quality reaches a minimum.

Similarly, also in the receive-weighting controller 706, receive weightings are adjusted, based on the measured values, such that signal quality is further improved.

Receiving Method

Using apparatuses described in conjunction with FIGS. 3 to 7 makes it possible to use various types of beams for transmitting and receiving signals. In the embodiments, (1) a Common Control Channel; (2) an Associated Control Channel; (3) a Shared Packet Data Channel; (4) a Dedicated Packet Data Channel; and (5) a Pilot Channel are transmitted in an uplink. A base station receives the above-identified channels by using antenna gain patterns realizing the various types of beams.

(1) The Common Control Channel includes a Random Access Channel (RACH) and a Reservation Channel (RCH). The Common Control Channel includes control information related to a relatively high-level layer process such as link setup and call control.

(2) The Associated Control Channel includes control information related to a relatively low-level layer process as well as information necessary to demodulate the Shared Packet Data Channel. The necessary information may include packet number, modulation scheme, coding scheme, transmit-power control bit, retransmit control bit, for example.

(3) The Shared Packet Data Channel is a high-speed radio resource shared among multiple users. A radio resource may be distinguished by frequency, code, transmit power, etc. The radio resource may be shared using Time Division Multiplexing (TDM), Frequency Division Multiplexing (FDM) and/or Code Division Multiplexing (CDM). Specific aspects of multiplexing will be discussed below with reference to FIG. 9 and figures thereafter. In order to realize a high-quality data transmission, schemes such as Adaptive Modulation and Coding (AMC), and Automatic Repeat Request (ARQ) are adopted.

(4) The Ddedicated Packet Data Channel is a radio resource dedicatedly allocated to a specific user. The radio resource may be distinguished by frequency, code, transmit power, etc. In order to realize a high-quality data transmission, schemes such as Adaptive Modulation and Coding (AMC), and Automatic Repeat Request (ARQ) are adopted.

(5) The Pilot Channel, including signals known at the transmitter and the receiver, is transmitted in an adaptive directional beam. The Pilot Channel is used for estimating a propagation path for a signal transmitted from a mobile terminal. Therefore, the Pilot Channel is a pilot channel dedicated to a mobile station.

In receiving scheme 1, a base station receives Common and Associated Control Channels in a sector beam. The base station receives Shared and Dedicated Packet Data Channels in a multi-beam or switched beam. The Pilot Channel is received in a sector beam for estimating propagation paths for the Shared and Associated Control Channels. Moreover, the Pilot Channel is also received in a multi-beam or switched beam for estimating propagation paths for the Shared and Dedicated Packet Data Channels. This scheme makes it possible to decrease a computational burden on the base station as it is not necessary to compute each time a weighting factor for realizing an antenna beam pattern.

In receiving scheme 2, the base station receives Common and Associated Control Channels in a sector beam. The Shared and Dedicated Packet Data Channels are received in an adaptive directional beam. The Pilot Channel is received in a sector beam for estimating propagation paths for the Shared and Associated Control Channels. Moreover, the Pilot Channel is also received in an adaptive directional beam for estimating propagation paths for the Shared and Dedicated Packet Data Channels. This scheme makes it possible to transmit and receive the Data Channels with high quality as they are received in an adaptive directional beam.

In receiving scheme 3, all Channels are received in a multi-beam or switched beam. A switched beam is any beam in a multi-beam. Therefore, it suffices that this scheme can realize a multi-beam, not requiring a sector beam or adaptive directional beam. Thus, types of beams can be reduced.

In receiving scheme 4, Common and Associated Control Channels are received in a multi-beam or switched beam. The Shared and Dedicated Packet Data Channels are received in an adaptive directional beam. The Pilot Channel is received in a multi-beam or switched beam for estimating propagation paths for the Shared and Associated Control Channels. Moreover, the Pilot Channel is also received in an adaptive directional beam for estimating a propagation path for the Shared and Dedicated Packet Data Channels. This scheme also makes it possible to reduce the types of beams by not requiring a sector beam.

Embodiment 2

In the Embodiment 1, the OFDM or OFCDM transmitter and receiver were described. However, other schemes may be adopted for the uplink. Various types of channels may be transmitted in the uplink using transmitters and receivers as shown in the below-described FIGS. 9 and 10.

Figure 9:
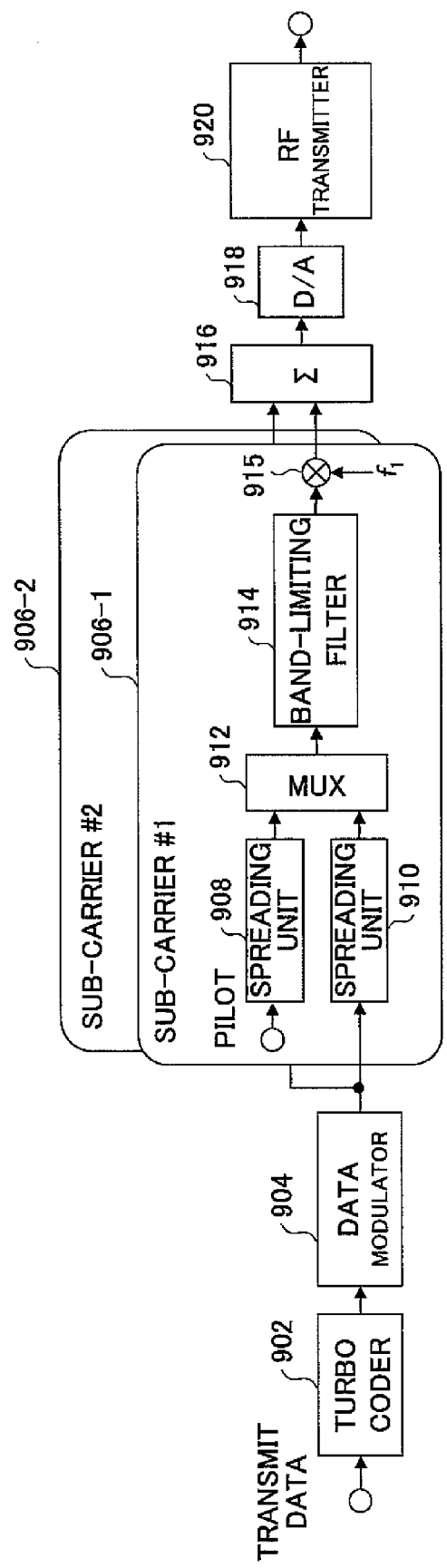
FIG. 9 illustrates a block diagram of a DS-CDMA transmitter.

FIG. 9 illustrates a block diagram of a DS-CDMA transmitter; Such a transmitter typically provided in a mobile terminal may be provided in a base station. The transmitter includes a turbo coder 902; a data modulator 904; a number of spreading and multiplexing units 906, the number being the number of sub-carriers; a synthesizer 916; a digital-to-analog-converter 918; and a RF transmitter 920. A first spreading and multiplexing unit 906-1 is described as representing the spreading and multiplexing unit 906 provided per sub-carrier as the respective units have the same features and functions. While only two spreading and multiplexing units are shown in FIG. 9 for brevity, any appropriate number of the spreading and multiplexing units may be provided. The spreading and multiplexing unit 906-1 includes a Pilot Channel spreading unit 908; a Data Channel spreading unit 910; a multiplexer 912; and a band-limiting filter 914.

The turbo coder 902 codes transmit data, thus improving error resilience.

The QPSK modulator 904 modulates the transmit data using an appropriate modulation scheme. The modulation scheme may be QPSK, 16 QAM, 64 QAM, or any other appropriate modulation scheme.

The number of spreading and multiplexing units 906, the number being the number of sub-carriers, performs a process for spreading and multiplexing the transmit signal. While a multi-carrier scheme is adopted in the embodiment, a single-carrier scheme may be adopted. Then, only one spreading and multiplexing unit is required. The Pilot Channel spreading unit 908 code-spreads a Pilot Channel. The Data Channel spreading unit 910 code-spreads transmit data. The multiplexer 912 multiplexes the code-spread Pilot Channel and transmit data. The band-limiting filter 914, including a root-Nyquist filter, for example, performs band-limiting. The mixer 915 converts the signal frequency in accordance with the sub-carrier frequency.

The synthesizer 916 synthesizes transmit signals output per sub-carrier.

The digital-to-analog converter 918 converts a digital signal to an analog signal.

The RF transmitter 920 performs such processes as frequency converting, band-limiting, and power amplifying.

The transmit data are coded in the turbo coder 902, modulated in the data modulator 904, and input to the processor per sub-carrier as described above. The processor per sub-carrier code-spreads the transmit data, and multiplexes the code-spread data with the spread pilot signal. The multiplexed signal is filtered with the band-limiting filter 914 and output as a signal per sub-carrier. The respective sub-carrier-related signals are synthesized in the synthesizer 916, converted in the digital-to-analog converter 918, and transmitted via the RF transmitter.

Figure 10:
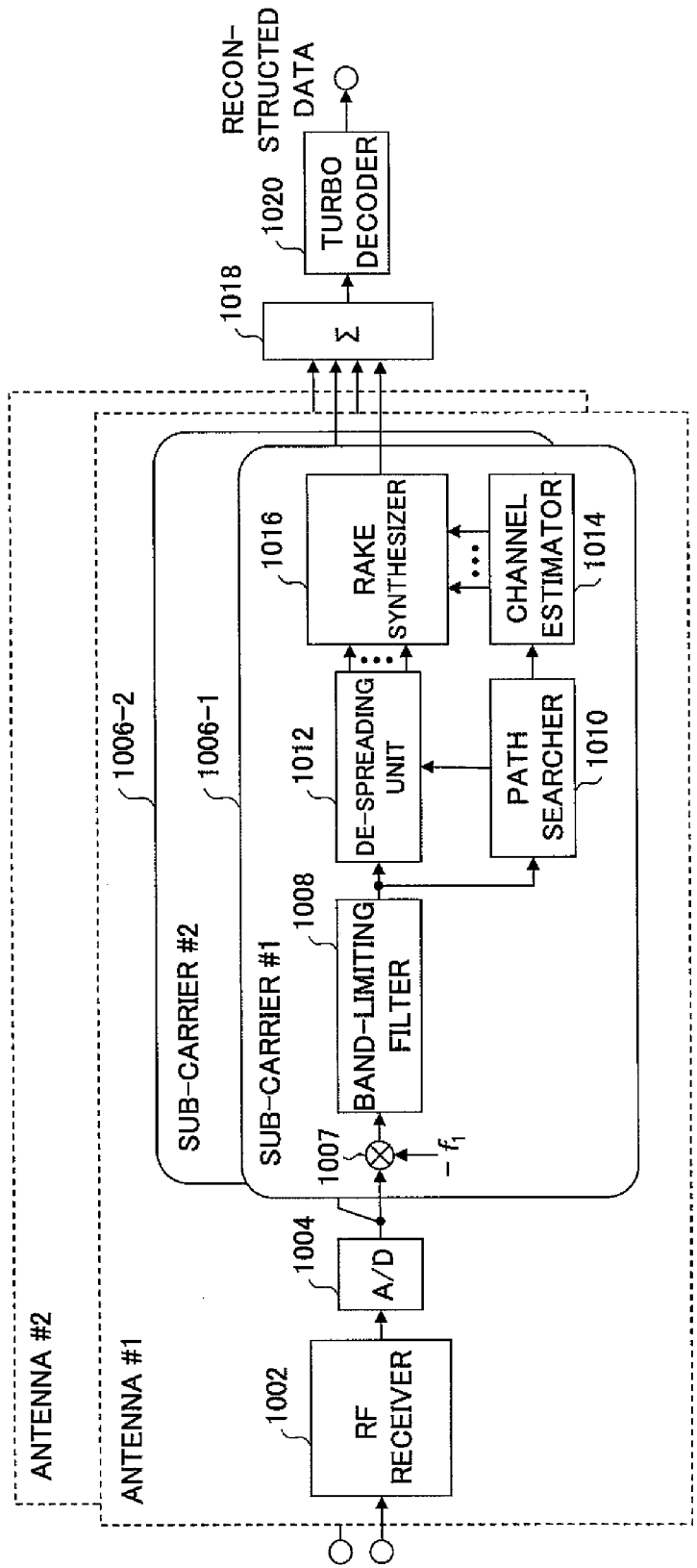
FIG. 10 illustrates a block diagram of a DS-CDMA receiver.

FIG. 10 illustrates a block diagram of a DS-CDMA receiver. Such a receiver typically provided in a base station may be provided in a mobile terminal. The receiver includes a processor for processing signals received with multiple antennas; a synthesizer 1018; and a turbo decoder 1020. While only two antennas are shown in FIG. 10, any appropriate number of antennas may be provided. Elements related to a first antenna are described as representing the respective antenna processes which are the same. The processor related to the first antenna includes a RF receiver 1002; an analog-to-digital converter 1004; and a number of de-spreading and separating units 1006, the number of units being the number of sub-carriers. A first de-spreading and separating unit 1006-1 is described as representing the respective de-spreading and separating units which have the same features and functions. The de-spreading and separating unit 1006-1 includes a mixer 1007; a band-limiting filter 1008; a path searcher 1010; a de-spreading unit 1012; a channel estimator 1014; and a rake synthesizer 1016.

The RF receiver 1002 performs processes such as power amplifying, frequency converting and band-limiting on a high-frequency signal received with an antenna.

The analog-to-digital converter 1004 converts an analog signal to a digital signal.

The number of de-spreading and separating unit 1006, the number being the number of sub-carriers, performs a process for de-spreading and separating of the received signal. While a multi-carrier scheme is adopted in the embodiment, a single-carrier scheme may be adopted. Then, only one de-spreading and separating unit is required. The mixer 1007 extracts a component related to a sub-carrier. The band-limiting filter 1008, including a root-Nyquist filter, for example, performs band-limiting. The path searcher 1010 searches a path in multi-path propagation paths. The path is searched by looking into a delay profile, for example. The de-spreading unit 1012 de-spreads a signal in accordance with a path timing. The channel estimator 1014 channel estimates using the path timing. The channel estimator 1014 outputs a control signal for adjusting amplitude and phase, in accordance with the estimating, such that fading produced in a propagation path is compensated for. The rake synthesizer 1016 compensates per path the de-spread signals so as to synthesize and output the signals.

The synthesizer 1018 synthesizes receive signals obtained per antenna.

The turbo decoder 1020 decodes the receive signal and demodulates data.

The signal received with each antenna is processed per antenna. The received signal undergoes processes within the RF receiver such as amplifying, frequency-converting, and bandwidth-limiting, and then is converted to a digital signal. The digital signal is, per sub-carrier, band-limited and de-spread, and rake synthesized per path. The per-sub-carrier rake-synthesized signals are synthesized in the synthesizer 1018 and decoded in the turbo decoder 1020, and the transmit signal is reconstructed.

Embodiment 3

Now multiplexing a (first Common, second Common or Dedicated) Pilot Channel, a (Common or Associated) Control Channel, and a (Common or Dedicated) Data Channel is described. The multiplexing is performed using at least one of Time Division Multiplexing (TDM), Frequency Division Multiplexing (FDM), and Code Division Multiplexing (CDM). TDM and CDM are performed in the multiplexer 306 within the transmitter in FIGS. 3, 6 and 7, and in the multiplexer 912 in FIG. 9. Separating the multiplexed signals is performed in a receiver (the separator 526, etc., in FIG. 5). FDM is performed in the serial-to-parallel converters 328, 348, etc., within the transmitter in FIGS. 3, 6, and 7. In accordance with the above, the multiplexed signals are separated in the parallel-to-serial converter 532 in FIG. 5, 1012 in FIG. 10, etc., at the receiver. While TDM switches one by one multiple signals multiplexed, FDM and CDM add multiple signals multiplexed. Note that the various below-described aspects of multiplexing are merely examples, so that they are not listed in a limiting sense.

Figure 11A:
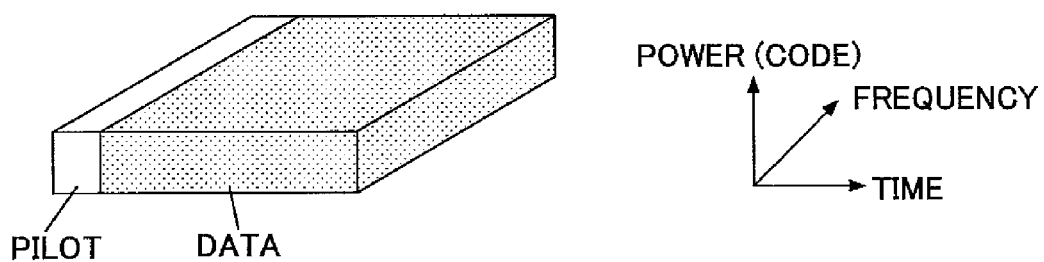
FIG. 11A illustrates a diagram of an example of multiplexing pilot and data channels.
Figure 11B:
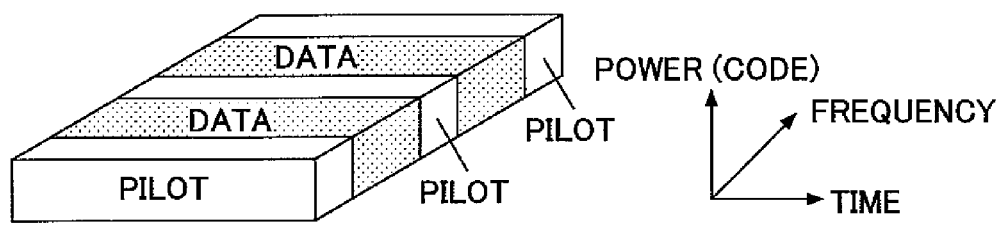
FIG. 11B illustrates a diagram of an example of multiplexing pilot and data channels.

FIGS. 11A and 11B illustrate an example of multiplexing pilot and data channels. FIG. 11A shows how pilot and data channels are time-multiplexed. In this way, it is more advantageous to insert a pilot channel in the frequency direction when an impact of frequency-selective fading is strong. The reason is that applying interleaving in the frequency direction makes it possible to reduce deterioration in transmission quality. FIG. 11B shows how pilot and data channels are frequency-multiplexed.

Figure 12B:
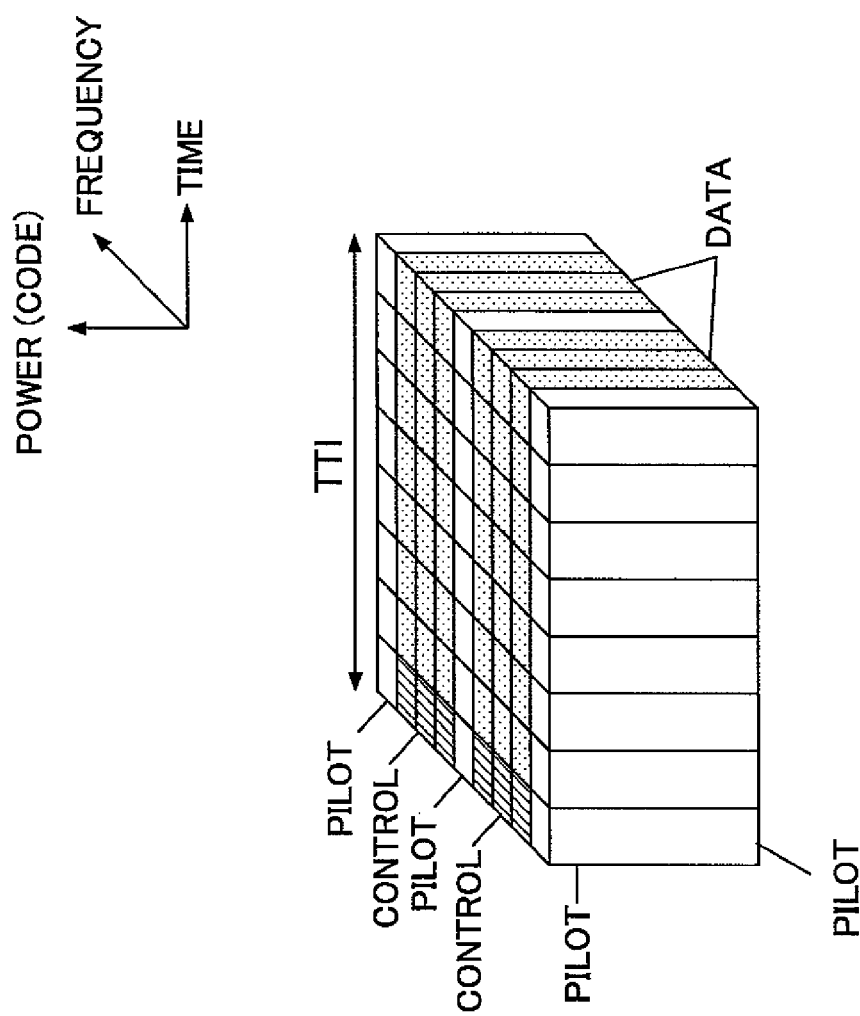
FIG. 12B illustrates another diagram of the first example of multiplexing pilot, control, and data channels.

FIGS. 12A and 12B illustrate diagrams of a first example of multiplexing pilot, control, and data channels. FIG. 12A shows how pilot, control, and data channels are time-multiplexed. As described above, from the point of view of taking into account the impact of frequency-selective fading, it is preferable to multiplex in this way. When it is necessary to multiplex data channels, they may be time-multiplexed or code-multiplexed. FIG. 12B shows how pilot and control channels are frequency-multiplexed, pilot and data channels are frequency-multiplexed, and control and data channels are time-multiplexed.

FIGS. 13A and 13B illustrate diagrams of a second example of multiplexing pilot, control, and data channels. FIG. 13A shows how pilot and control channels are frequency-multiplexed, and how they are time-multiplexed with data channels. An example in FIG. 13A where only one-symbol period is required before the data channel is advantageous over one in FIG. 12A where a two-symbol period is shown to be required before the data channel. FIG. 13B shows how pilot, control, and data channels are time-multiplexed, and how control and data channels are frequency-multiplexed.

Figure 14A:
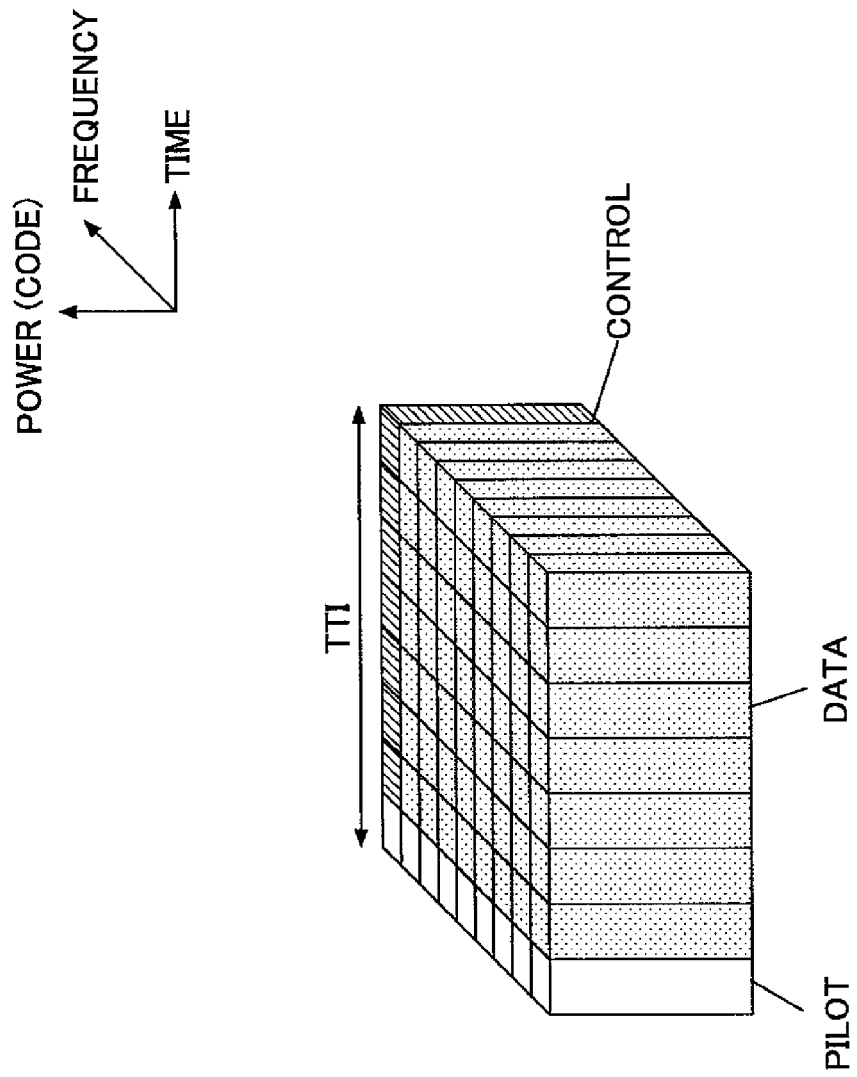
FIG. 14A illustrates a diagram of a third example of multiplexing control and data channels.

FIGS. 14A and 14B illustrate diagrams of a third example of multiplexing pilot, control, and data channels. FIG. 14A shows how pilot channels are time-multiplexed with control and data channels, and how control and data channels are frequency-multiplexed. FIG. 14B shows how pilot, control, and data channels are frequency-multiplexed.

FIGS. 15A and 15B illustrate diagrams of a fourth example of multiplexing pilot, control, and data channels. FIG. 15A shows how pilot channels are time-multiplexed with control and data channels, and how control and data channels are code-multiplexed. Alternatively, control and data channels are time-multiplexed, and pilot and data channels are code-multiplexed. FIG. 15B shows how pilot channels are frequency-multiplexed with control and data channels, and how control and data channels are code-multiplexed. Alternatively, pilot, control, and data channels may all be code-multiplexed.

Embodiment 4

In the below-described embodiment, Variable Spreading and Chip Repetition Factors-CDMA (VSCRF-CDMA) is adopted for an uplink. The transmitter and receiver in this case, generally the same as the DS-CDMA transmitter and receiver as described in conjunction with FIGS. 9 and 10, differs therefrom in the processes related to spreading and de-spreading.

Figure 16:
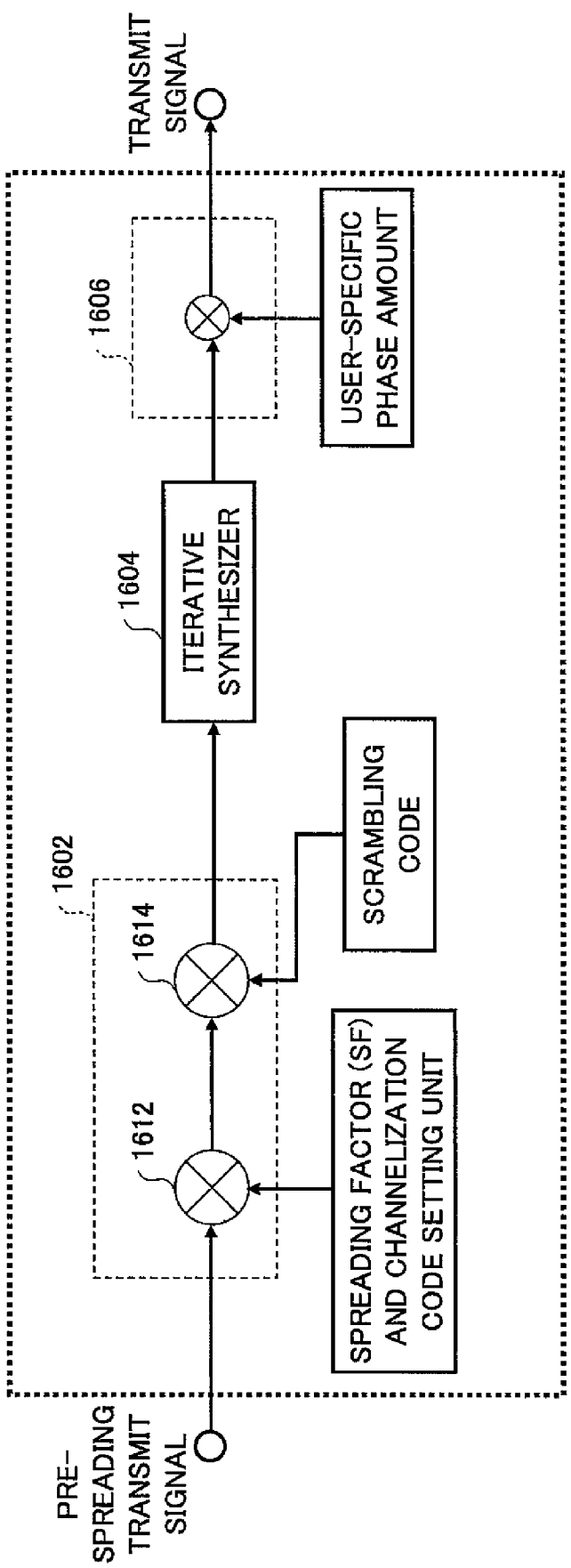
FIG. 16 illustrates a block diagram of a spreading unit used in a VSCRF-CDMA transmitter.

FIG. 16 illustrates a block diagram of a spreading unit used in a VSCRF-CDMA transmitter. Thus, the below-described operation of the spreading unit is typically performed at the mobile terminal. The spreading unit may be used in lieu of the spreading unit 908 and/or 910 in FIG. 9. The spreading unit includes a code multiplying unit 1602; an iterative synthesizer 1604; and a phase shifter 1606.

The code multiplier 1602 multiplies spread codes and a transmit signal. In FIG. 16, a channelization code specified under a given code-spreading factor (SF) is multiplied at the multiplying unit 1612 with the transmit signal. Moreover, a scrambling code is multiplied at the multiplying unit 1614 with the transmit signal.

The iterative synthesizer 1604 time-compresses the spread transmit signal and repeats the process a predetermined number of times (CRF times). The features and operations for the case where the repetition number CRF is equal to 1 would be equivalent to the case of the DS-CDMA described in conjunction with FIGS. 9 and 10 (for CRF=1, no phase shift at the phase shifter is required).

The phase shifter 1606 shifts the transmit signal phase by a predetermined frequency. The phase amount to be shifted is specifically set per mobile terminal.

Figure 17:
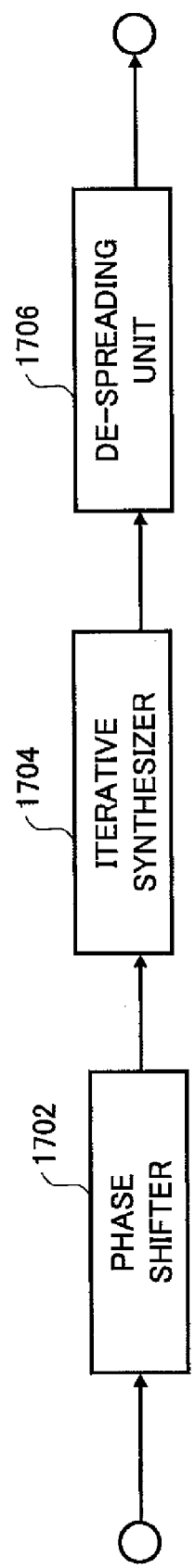
FIG. 17 illustrates a block diagram of a de-spreading unit used in a VSCRF-CDMA transmitter.

FIG. 17 illustrates a block diagram of a de-spreading unit used in a VSCRF-CDMA receiver. The de-spreading unit can be used in lieu of the de-spreading unit in FIG. 10. Thus, the below-described operation of the de-spreading unit is typically performed at the base station. The de-spreading unit includes a phase shifter 1702; an iterative synthesizer 1704; and a code de-spreading unit 1706.

The phase shifter 1702 multiplies a received signal and a phase amount set per mobile terminal, and separates the received signal into the respective mobile terminal signals.

The iterative synthesizer 1704 time-extends repeated data, and reconstructs data which are uncompressed.

The code de-spreading unit 1706 de-spreads by multiplying a received signal and a spread code per mobile terminal.

Figure 18:
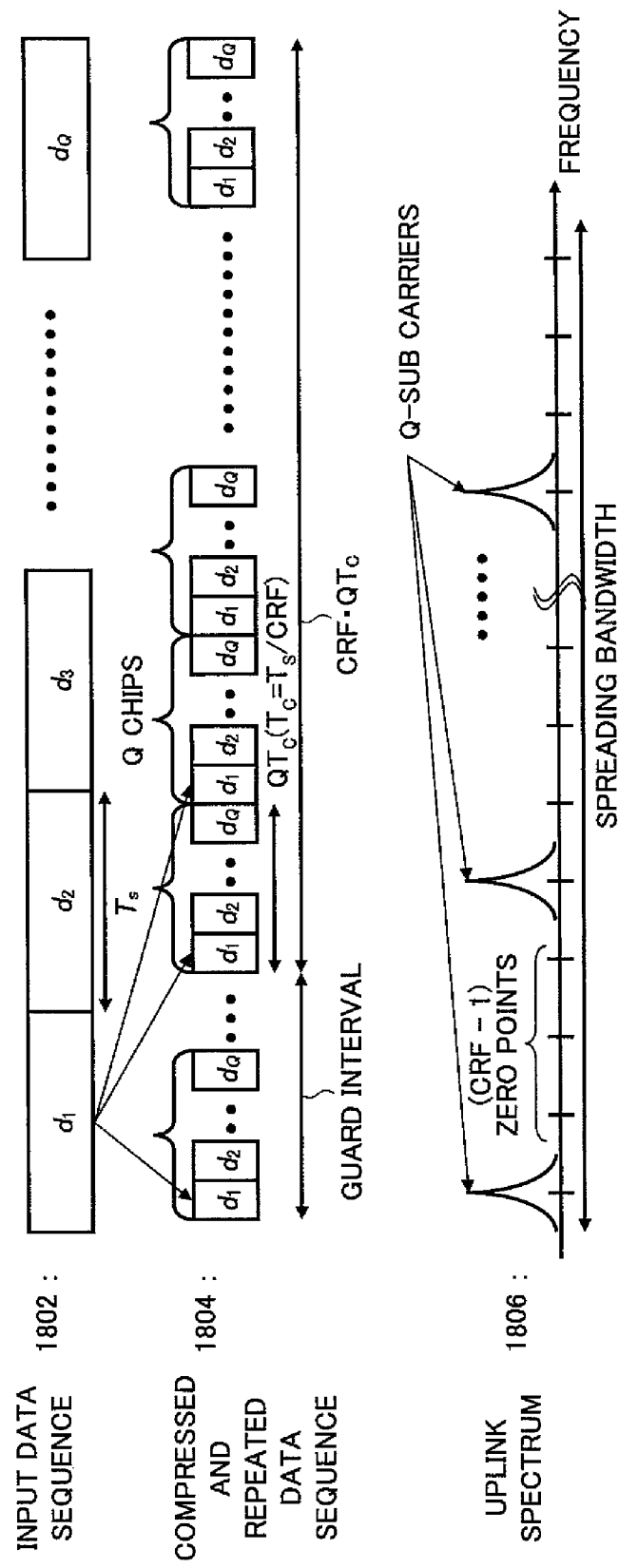
FIG. 18 illustrates a diagram for explaining operating principles of VSCRF-CDMA.

FIG. 18 illustrates a view for explaining major operations in VSCRF-CDMA. For the convenience of explanations, a group of data in a code-spread signal stream is expressed as $d_1, d_2, \ldots, d_Q$, where the time period for the individual data item $d_i$ (i=1, ..., Q) is $T_s$. One data item $d_i$ may be collated to one symbol, or any other appropriate information unit. The one group of signal streams has in total a time period corresponding to $T_s \times Q$. The signal stream 1802 corresponds to a signal input to the iterative synthesizer 1604. The signal stream is time-compressed by CRF, and converted such that the compressed signal is repeated for the time period of Ts×Q. The converted signal stream is shown as 1804 in FIG. 18. FIG. 18 also shows a guard-interval period. The time-compressing may be performed by using a frequency which is CRF times higher than a clock frequency used for an input signal, for example. In this way, the individual data $d_i$ time period is compressed to $T_s/CRF$ (repeated CRF times). The compressed and repeated signal stream 1804 is output from an iterative synthesizer 1604, input to the phase shifter 1606, shifted by a predetermined phase amount, and output. The phase amount set per mobile terminal is set such that the respective mobile-terminal related uplink signals are mutually orthogonal on the frequency axis. In this way, the frequency spectrum in the uplink or base station receive signal would generally be as shown in 1806 in FIG. 18. The bandwidth shown as a spreading bandwidth is a bandwidth which would be taken up if the spread signal stream 1802 were transmitted as it is. The time-compressed and repeated spectrum (the spectrum of the output signal of the iterative synthesizer 1604) takes up a narrow bandwidth which is common to all mobile terminals. Shifting the narrow bandwidth by a phase amount specific to a mobile terminal makes it possible to prevent the bandwidths from overlapping with each other. In other words, time compressing, repeating, and phase shifting allow setting the respective mobile terminal frequency bands narrow, and arranging them in a comb-tooth shape, thus making it possible to realize orthogonality on the frequency axis.

Now, an operation in reverse of one at the transmitter is performed at the receiver. In other words, in accordance with the phase amount per mobile terminal, a phase is provided to a receive signal in the phase shifter 1702 in FIG. 17 for inputting to the iterative synthesizer 1704. The input signal is time-extended, converted to a spread signal stream, and output from the iterative synthesizer 1704. De-spreading is performed on the signal by multiplying with a predetermined spread code at the de-spreading unit 1706. Thereafter, further processes are performed using the already-described elements.

The code spreading factor SF according to the embodiment is appropriately set in accordance with the communication environment. More specifically, the code spreading factor SF may be set based on one or more of (1) propagation path condition; (2) cell configuration; (3) traffic volume; and (4) radio parameters. The code spreading factor SF may be set at the base station or at the mobile terminal. It is preferable to determine the code spreading rate at the base station in the case of using information controlled at the base station such as the traffic volume.

Figure 19:
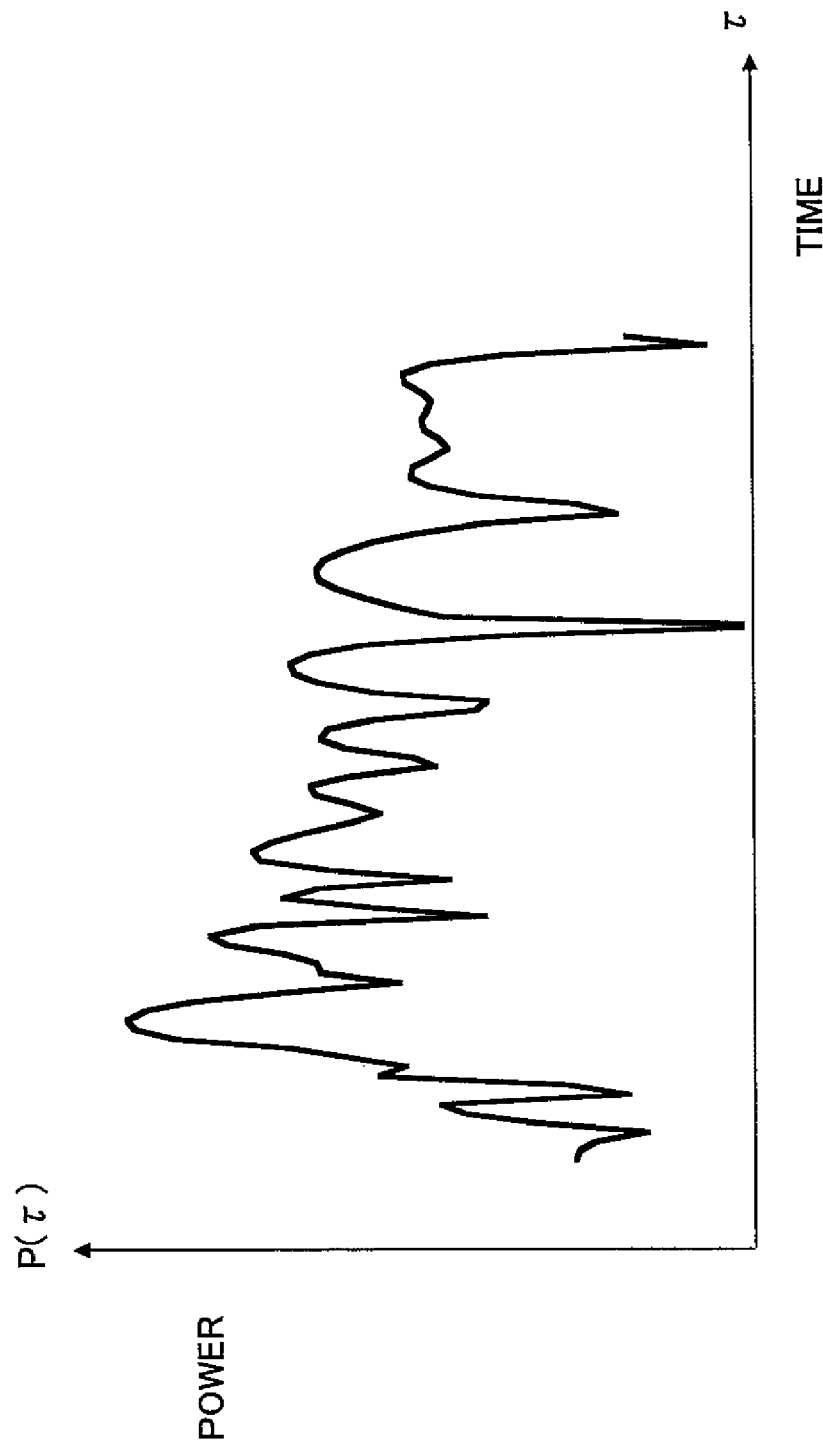
FIG. 19 illustrates a diagram of a power-delay profile for a receive signal.

(1) The propagation path condition may be evaluated by measuring the delay spread or the maximum Doppler frequency. The delay spread S may be calculated in accordance with the following equations based on a delay profile as shown in FIG. 19, for example:

$$S = \frac{\int (\tau - \tau_0)^2 P(\tau) d\tau}{\int P(\tau) d\tau}$$

$$\tau_0 = \frac{\int \tau P(\tau) d\tau}{\int P(\tau) d\tau}$$

Equations 1

Here $P(\tau)$ represents power. Moreover, the maximum Doppler frequency may be determined by computing an inner product of two time-distant signals having the same contents. For example, when pilot channels are time-multiplexed, pilot channels inserted in different time slots may be used as shown in FIG. 20A. When pilot channels are code-multiplexed, first and second half-period pilot channels may be used as shown in FIG. 20B. In either case, if the time change is large, the inner product of time-wise different pilot channels would be small, and, if not, otherwise. (When time-invariant, the maximum value 1 is maintained.)

It is desirable that the code spreading factor for the frequency domain be set small since the larger the delay spread, the larger the fluctuation in the frequency domain. Conversely, it is desirable that the code spreading factor for the frequency domain be set large for a small delay spread. It is desirable that the code spreading factor related to the time domain be set small since the larger the maximum Doppler frequency, the larger the fluctuation in the time domain. Conversely, it is desirable that the code spreading factor for the time domain be set large for a small Doppler frequency.

(2) Cell configurations include a multi-cell or isolated-cell communication environment, and an indoor environment, for example. In the multi-cell, it is desirable to make the code spreading factor large in order to suppress other-cell interference. Conversely, in the isolated cell or indoor environment where it is not necessary to take such interference into account, it is desirable to set the code spreading factor small or as 1. The cell configuration determination may be reported with some separately provided control signal, or performed based on a receive signal. In the latter case, the evaluation is performed by measuring interference power from surrounding cells. For example, when using a time-multiplexed pilot channel, the evaluation is performed by subtracting power related to the pilot channel (desired wave) from total signal power (desired wave+undesired wave) within a frame (slot). The scheme ignores thermal noise included in the calculated value as the magnitude is small. When pilot channels are code-multiplexed, interference power from surrounding cells may be simply evaluated, ignoring own-cell interference. More accurately, interference power from surrounding cells may be evaluated by pre-calculating own-cell interference amount, and subtracting the amount from total interference power. Alternatively, code-spread pilot channels may be time-multiplex transmitted to ensure that own-cell interference of the pilot channel is avoided.

(3) Spreading factor may be changed based on traffic volume, the number of users, and transmission rate, etc. For example, for a large number of users, the spreading factor may be set large in order to suppress mutual interference.

(4) The code spreading factor may be set in accordance with radio parameters such as modulation scheme and channel coding rate. For example, when Adaptive Modulation and Coding (AMC) is adopted, a listing table may be prepared which is related to the receive signal quality as well as parameters (ie., modulation scheme, coding rate, and code spreading factor SF) such that they are adaptively changed.

Embodiment 5

FIG. 21 and beyond show aspects of multiplexing data channels with other channels in VSCRF-CDMA. These aspects are exemplary and not limiting.

Figure 21A:
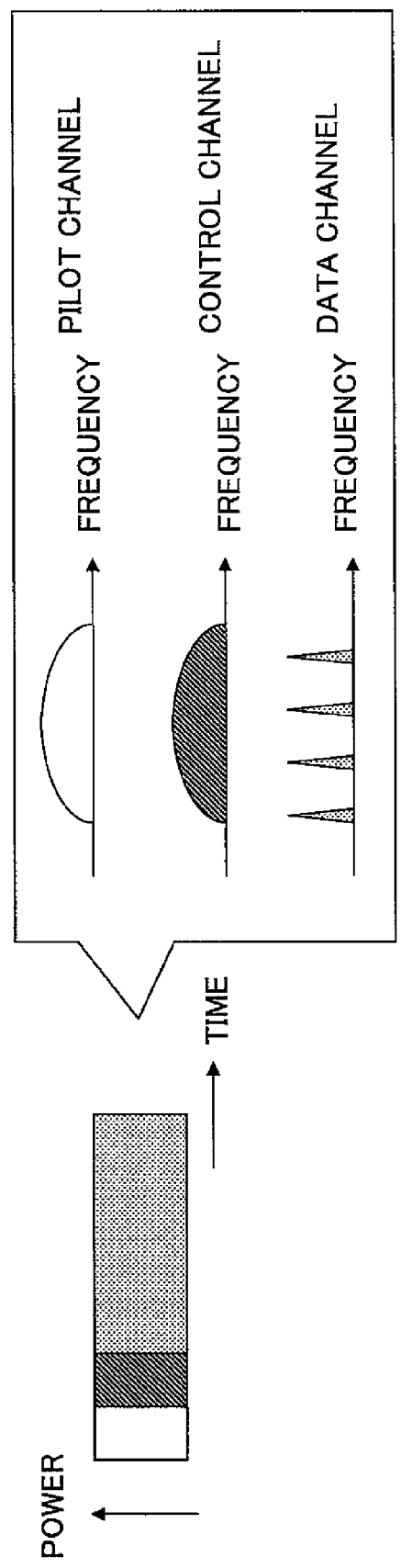
FIG. 21A illustrates a diagram of a first example of multiplexing to a chip-repeated data channel.
Figure 21B:
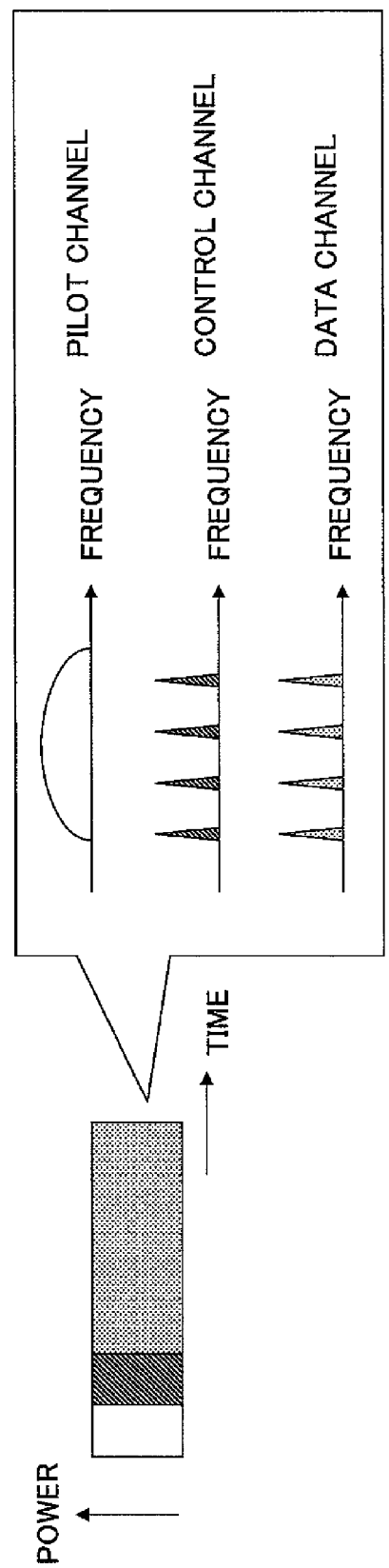
FIG. 21B illustrates another diagram of the first example of multiplexing to the chip-repeated data channel.
Figure 21C:
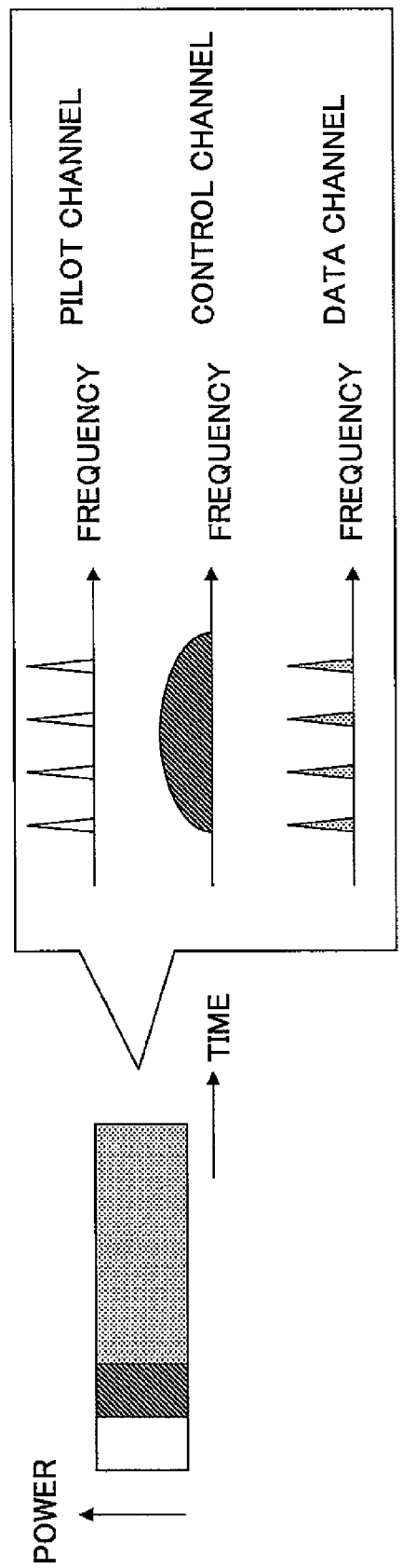
FIG. 21C illustrates a further diagram of the first example of multiplexing to the chip-repeated data channel.
Figure 21D:
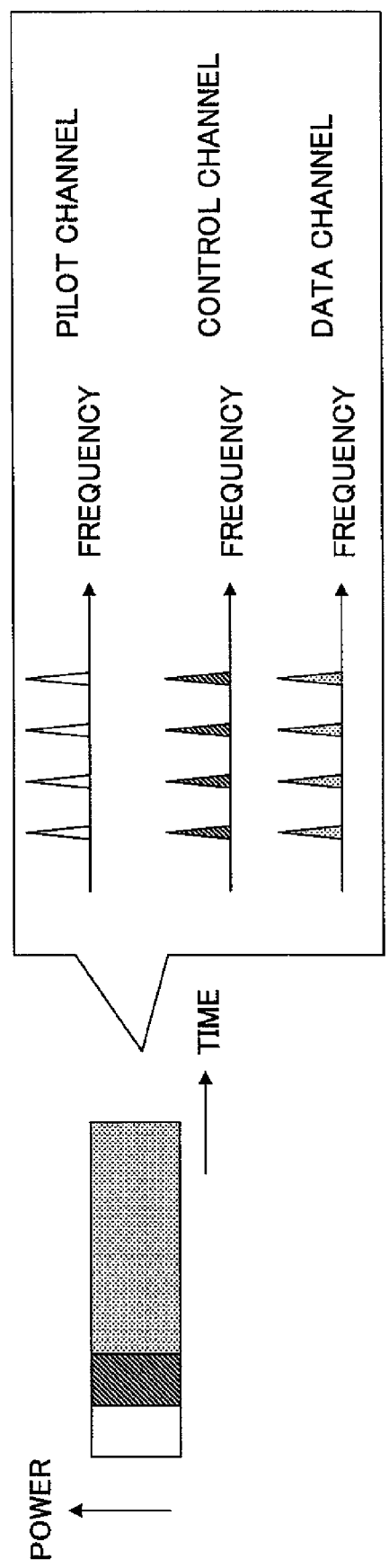
FIG. 21D illustrates yet another diagram of the first example of multiplexing to the chip-repeated data channel.

FIGS. 21A-D show examples where pilot and control channels are time-multiplexed with chip (or symbol) repeated (VSCRF-CDMA) data channels. FIG. 21A shows VSCRF-CDMA applied to data channels only with pilot and control channels merely code-spread. A signal on the time axis is conceptually shown on the left with the signal on the frequency axis conceptually shown on the right (the same applies to other figures). FIG. 21B shows VSCRF-CDMA applied to control and data channels with the pilot channel merely code-spread. FIG. 21C shows VSCRF-CDMA applied to pilot and data channels with the control channel merely code-spread. FIG. 21D shows VSCRF-CDMA applied to all channels.

Figure 22A:
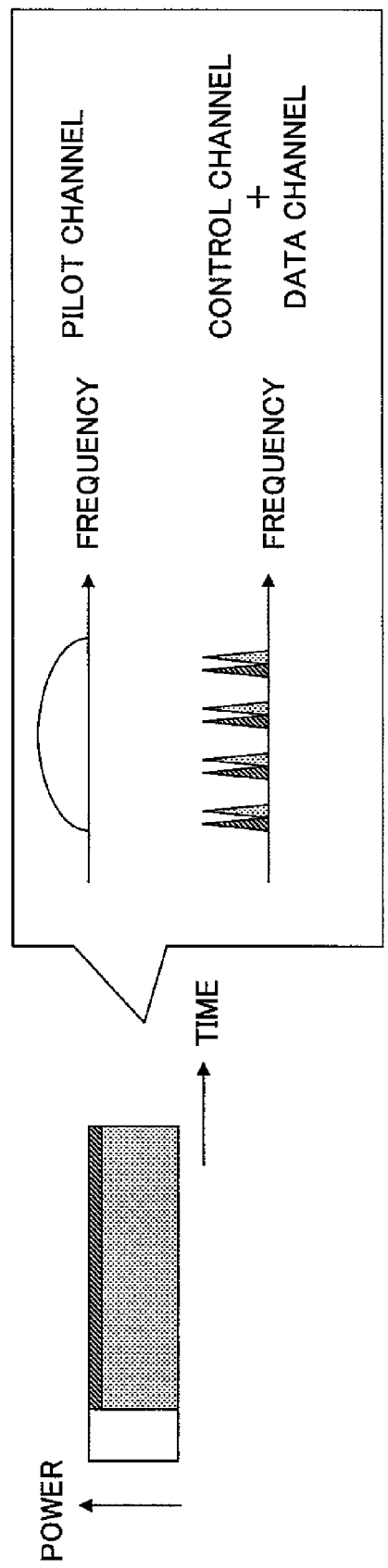
FIG. 22A illustrates a diagram of a second example of multiplexing to a chip-repeated data channel.
Figure 22B:
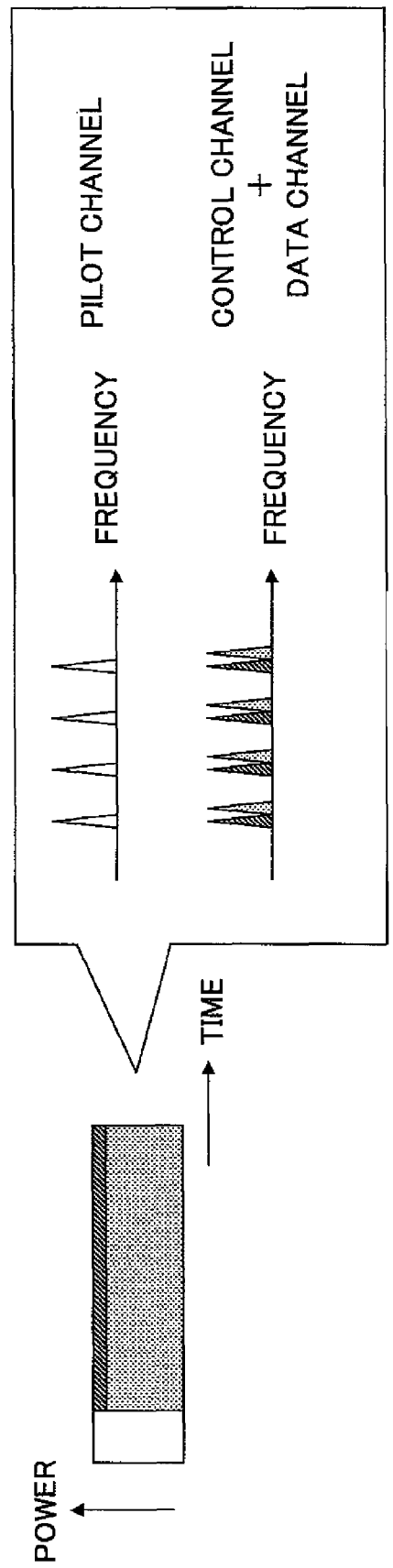
FIG. 22B illustrates another diagram of the second example of multiplexing to the chip-repeated data channel.

FIGS. 22A-B show examples where pilot channels are time-multiplexed and control channels are frequency-multiplexed with chip repeated data channels. Control channels are allocated to frequencies different from data channels. FIG. 22A shows VSCRF-CDMA applied to control and data channels with the pilot channel merely code-spread. FIG. 22B shows VSCRF-CDMA applied to all channels.

Figure 23:
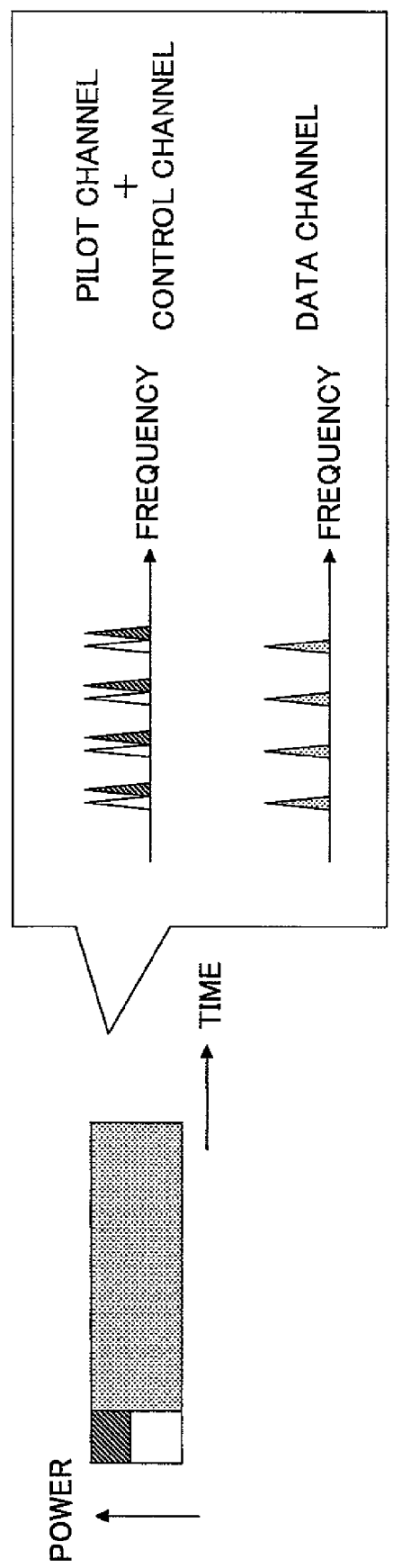
FIG. 23 illustrates a diagram of a third example of multiplexing to a chip-repeated data channel.

FIG. 23 shows an example where control and pilot channels are time-multiplexed and pilot and control channels are frequency-multiplexed with chip repeated data channels. The illustrated example shows VSCRF-CDMA applied to all channels.

Figure 24A:
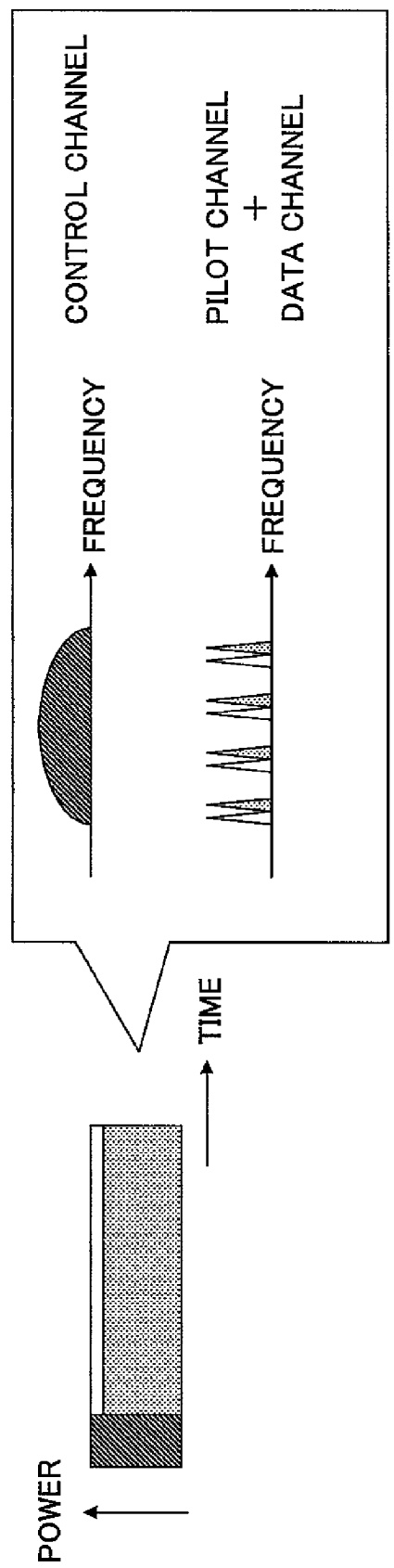
FIG. 24A illustrates a diagram of a fourth example of multiplexing to a chip-repeated data channel.
Figure 24B:
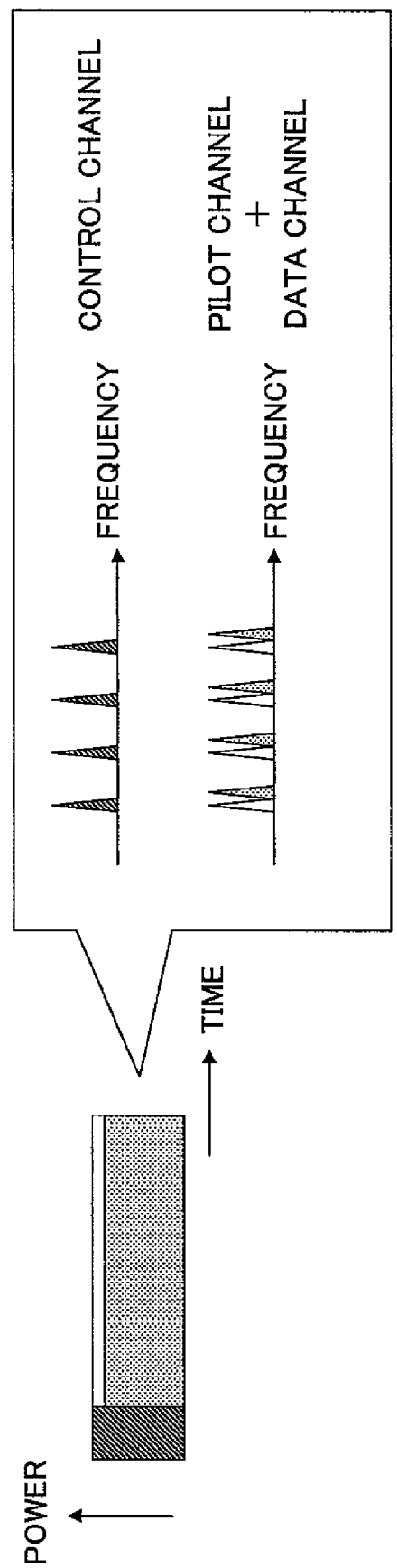
FIG. 24B illustrates another diagram of the fourth example of multiplexing to the chip-repeated data channel.

FIGS. 24A-B show examples where pilot channels are frequency-multiplexed and control channels are time-multiplexed with chip repeated data channels. Pilot channels are allocated to frequencies different from data channels. FIG. 24A shows an example where VSCRF-CDMA is applied to pilot and data channels with the control channel merely code-spread. FIG. 24B shows an example where VSCRF-CDMA is applied to all channels.

Figure 25A:
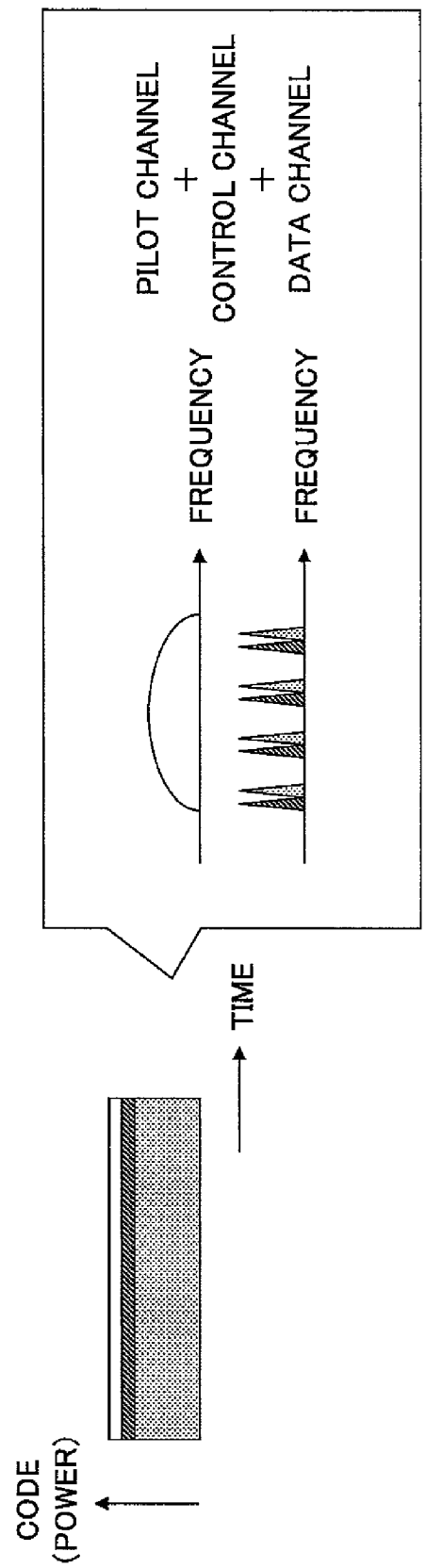
FIG. 25A illustrates a diagram of a fifth example of multiplexing to a chip-repeated data channel.
Figure 25B:
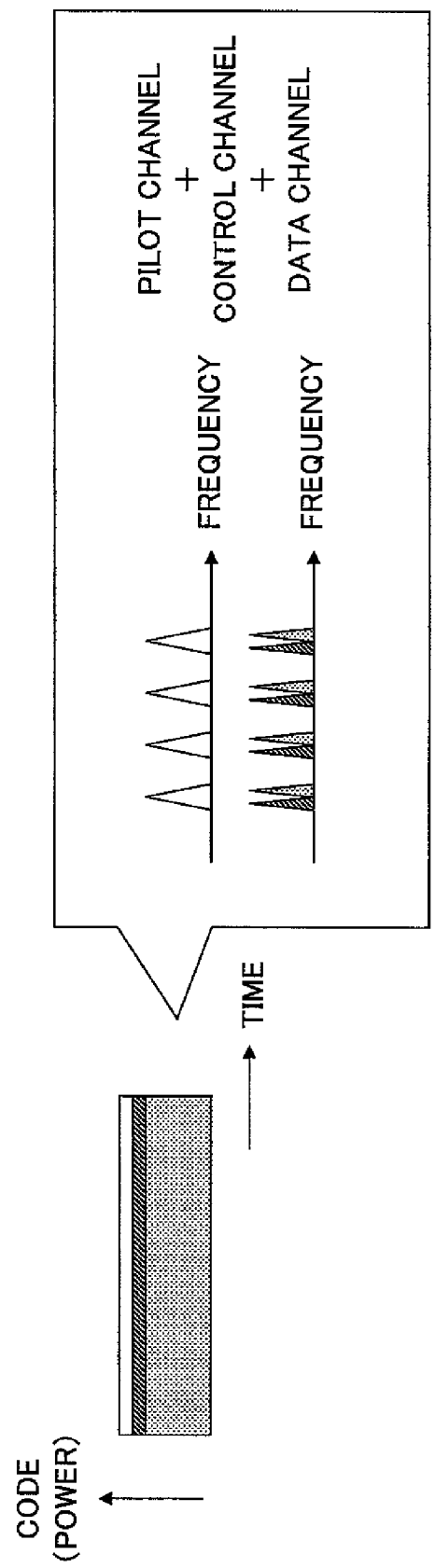
FIG. 25B illustrates another diagram of the fifth example of multiplexing to the chip-repeated data channel.

FIGS. 25A-B show examples where pilot and control channels are code-multiplexed and control and data channels are frequency-multiplexed with chip repeated data channels. FIG. 25A shows an example where VSCRF-CDMA is applied to control and data channels with the pilot channel merely code-spread. FIG. 25B shows an example where VSCRF-CDMA is applied to all channels.

Figure 26A:
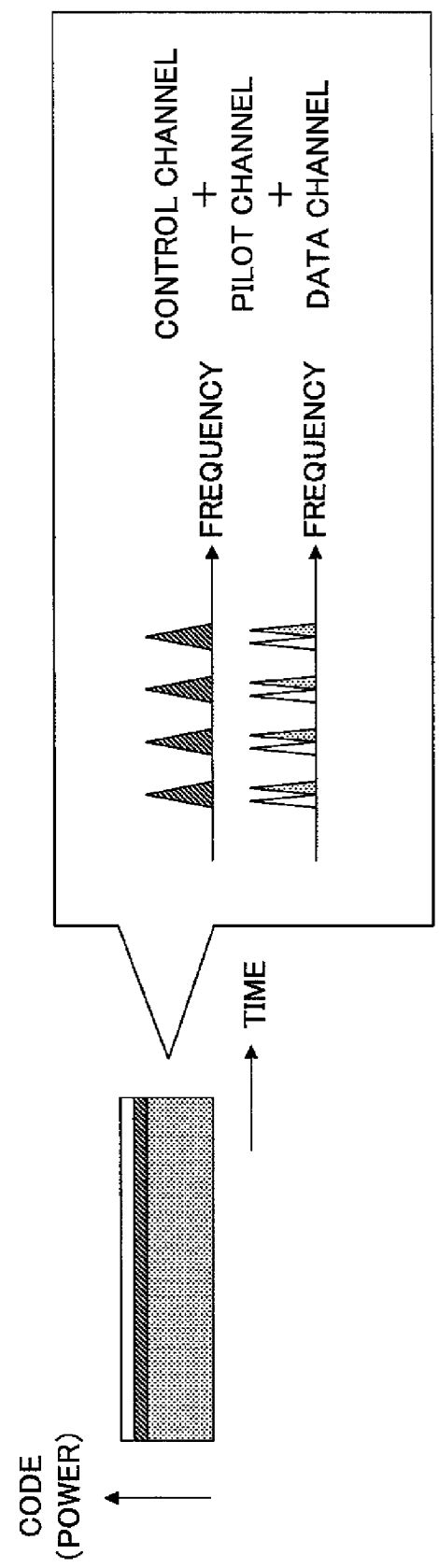
FIG. 26A illustrates a diagram of a sixth example of multiplexing to a chip-repeated data channel.
Figure 26B:
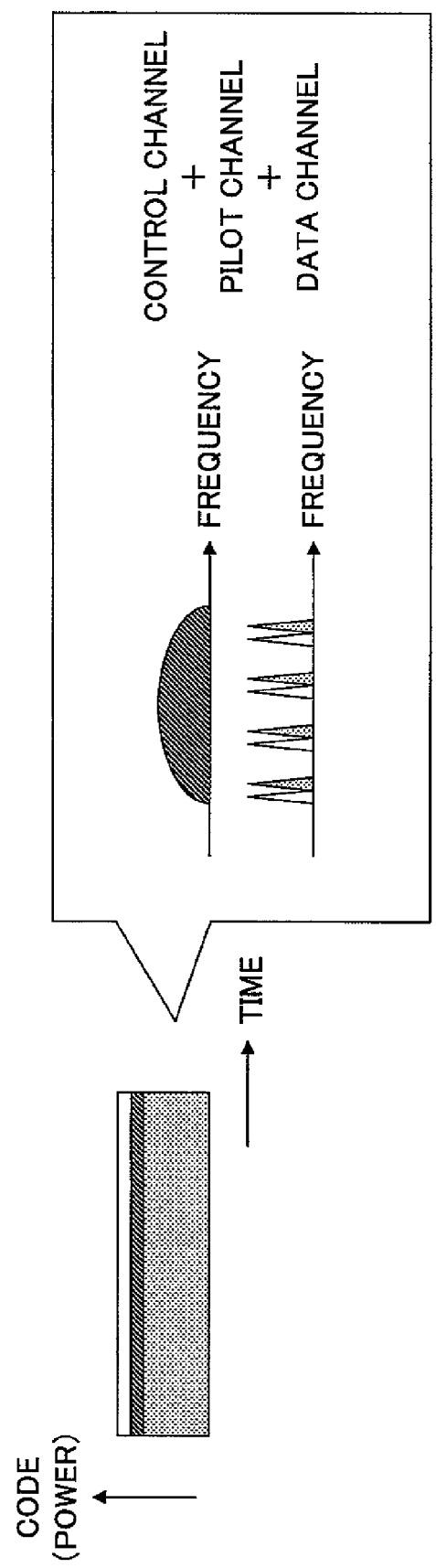
FIG. 26B illustrates another diagram of the sixth example of multiplexing to the chip-repeated data channel.

FIGS. 26A-B show examples where pilot and control channels are code-multiplexed and pilot and data channels are frequency-multiplexed with chip repeated data channels. FIG. 26A shows an example where VSCRF-CDMA is applied to all channels. FIG. 26B shows an example where VSCRF-CDMA is applied to pilot and data channels with the control channel merely code-spread.

Figure 27:
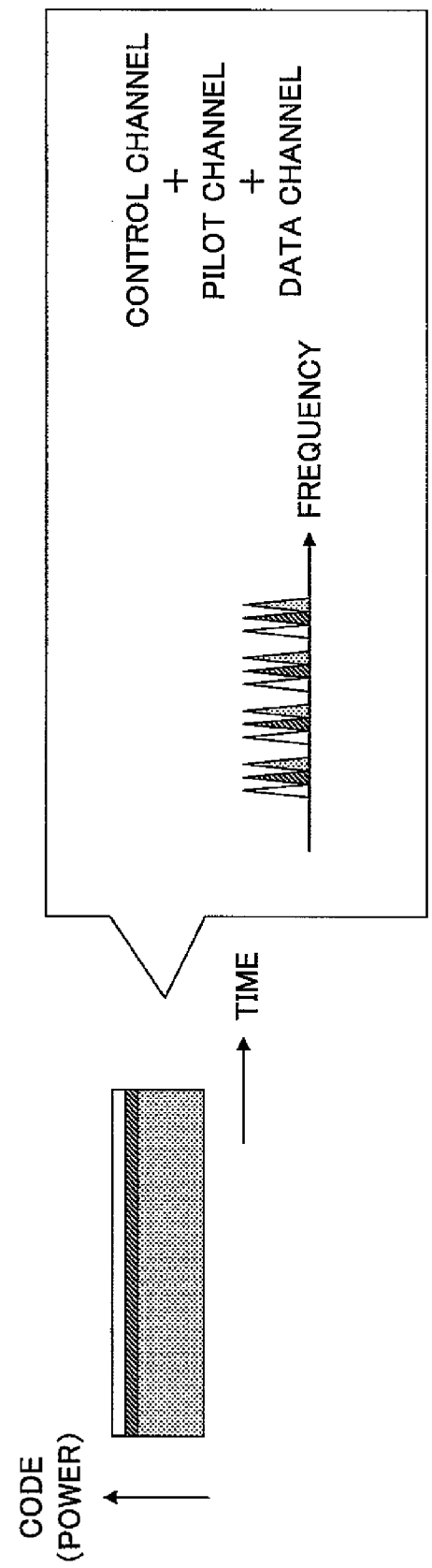
FIG. 27 illustrates a diagram of a seventh example of multiplexing to a chip-repeated data channel.

FIG. 27 shows an example where pilot and control channels are frequency-multiplexed with chip repeated data channels. The illustrated example shows VSCRF-CDMA applied to all channels.

FIG. 28 shows an example where pilot and control channels are code-multiplexed with chip repeated data channels. The illustrated example shows VSCRF-CDMA applied to all channels.

The present invention is not limited to the above-described preferred embodiments thereof, so that various variations and changes are possible within the scope of the spirit thereof. For the convenience of explanations, the present invention has been described by breaking down into a number of embodiments. However, such a breakdown by the description of the embodiments is not essential, so that one or more embodiments may be used as needed.

The present application claims priority based on Japanese Patent Application No. 2005-106909 filed on Apr. 1, 2005 with the Japanese Patent Office, the entire contents of which are hereby incorporated by reference.

The invention claimed is:

1. A receiving apparatus for receiving in an uplink one or a plurality of control channels, one or a plurality of pilot channels, and one or a plurality of data channels, comprising:
   a pilot-channel receiving unit for receiving the pilot channel in an antenna-gain pattern of a multi-beam including multiple fixed directional beams having respectively different fixed directional directions or of a variable directional beam having a directional direction varying in accordance with the position of a mobile terminal; and
   a data-channel receiving unit for receiving the data channel in the antenna-gain pattern of the multi-beam or the variable directional beam,
   wherein time-multiplexed pilot channels and data channels are separated into respective time periods,
   wherein time-multiplexed control channels and data channels are also separated into respective time periods, and
   wherein one of the time-multiplexed pilot channels and control channels, and the time-multiplexed data channels are separated into respective time periods, the other channels are frequency-multiplexed, and frequency-multiplexed data channels are separated into respective frequencies.

2. A receiving apparatus for receiving in an uplink one or a plurality of control channels, one or a plurality of pilot channels, and one or a plurality of data channels, comprising:
   a pilot-channel receiving unit for receiving the pilot channel in an antenna-gain pattern of a multi-beam including multiple fixed directional beams having respectively different fixed directional directions or of a variable directional beam having a directional direction varying in accordance with the position of a mobile terminal; and
   a data-channel receiving unit for receiving the data channel in the antenna-gain pattern of the multi-beam or the variable directional beam,
   wherein time-multiplexed pilot channels and data channels are separated into respective time periods,
   wherein time-multiplexed control channels and data channels are also separated into respective time periods,
   wherein code-multiplexed pilot channels and control channels are separated into respective codes, and
   wherein frequency-multiplexed or code-multiplexed control channels and data channels are separated into respective frequencies or codes.

3. A receiving apparatus for receiving in an uplink one or a plurality of control channels, one or a plurality of pilot channels, and one or a plurality of data channels, comprising:
   a pilot-channel receiving unit for receiving the pilot channel in an antenna-gain pattern of a multi-beam including multiple fixed directional beams having respectively different fixed directional directions or of a variable directional beam having a directional direction varying in accordance with the position of a mobile terminal; and
   a data-channel receiving unit for receiving the data channel in the antenna-gain pattern of the multi-beam or the variable directional beam,
   wherein time-multiplexed pilot channels and data channels are separated into respective time periods,
   wherein time-multiplexed control channels and data channels are also separated into respective time periods, and wherein frequency-multiplexed or code-multiplexed pilot channels, control channels and data channels are separated into respective frequencies or codes.

4. A system comprising:

a receiving apparatus for receiving in an uplink one or a plurality of control channels, one or a plurality of pilot channels, and one or a plurality of data channels, comprising:

- a pilot-channel receiving unit for receiving the pilot channel in an antenna-gain pattern of a multi-beam including multiple fixed directional beams having respectively different fixed directional directions or of a variable directional beam having a directional direction varying in accordance with the position of a mobile terminal; and
- a data-channel receiving unit for receiving the data channel in the antenna-gain pattern of the multi-beam or the variable directional beam,
- wherein time-multiplexed pilot channels and data channels are separated into respective time periods,
- wherein time-multiplexed control channels and data channels are also separated into respective time periods, and
- wherein one of the time-multiplexed pilot channels and control channels, and the time-multiplexed data channels are separated into respective time periods, the other channels are frequency-multiplexed, and frequency-multiplexed data channels are separated into respective frequencies; and a transmitting apparatus for transmitting to the receiving apparatus in the uplink one or a plurality of pilot channels, one or a plurality of control channels, and one or a plurality of data channels, wherein the data channels, and at least one of the pilot channels and control channels are transmitted using Variable Spreading and Chip Repetition Factors-Code Division Multiple Access (VSCRF-CDMA).

5. A method of transmitting in an uplink one or a plurality of pilot channels, one or a plurality of control channels, and one or a plurality of data channels, comprising the steps of:

using Variable Spreading and Chip Repetition Factors-Code Division Multiple Access (VSCRF-CDMA), code-spreading, compressing, and repeating the data channels, and at least one of the pilot channels and control channels;

shifting, by a predetermined amount, a phase of a signal to be transmitted; and multiplexing and transmitting the pilot channels, the data channels, and the control channels.

\* \* \* \* \*